(12) United States Patent
Madnani et al.

(10) Patent No.: US 8,107,467 B1
(45) Date of Patent: *Jan. 31, 2012

(54) FULL ARRAY NON-DISRUPTIVE FAILOVER

(75) Inventors: Kiran Madnani, Framingham, MA (US); Adi Ofer, Framingham, MA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 931 days.

This patent is subject to a terminal disclaimer.

(21) Appl. No.: 11/318,756

(22) Filed: Dec. 27, 2005

Related U.S. Application Data

(63) Continuation-in-part of application No. 11/241,165, filed on Sep. 30, 2005, now Pat. No. 8,072,987.

(51) Int. Cl.
*H04L 12/50* (2006.01)
*G06F 7/00* (2006.01)

(52) U.S. Cl. .................................. 370/383; 707/674
(58) Field of Classification Search ............... 370/395.7; 711/5, 165, 162; 701/214
See application file for complete search history.

(56) References Cited

U.S. PATENT DOCUMENTS

| | | | |
|---|---|---|---|
| 5,247,632 A | 9/1993 | Newman | |
| 6,363,462 B1 | 3/2002 | Bergsten | |
| 6,421,711 B1 | 7/2002 | Blumenau et al. | |
| 6,477,632 B1 | 11/2002 | Kikuchi | |
| 6,598,174 B1 | 7/2003 | Parks et al. | |
| 6,714,952 B2 | 3/2004 | Dunham et al. | |
| 6,839,750 B1 | 1/2005 | Bauer et al. | |
| 7,051,101 B1 | 5/2006 | Dubrovsky et al. | |
| 7,124,143 B2 * | 10/2006 | Matsunami et al. | 707/101 |
| 7,219,092 B2 | 5/2007 | Ikegaya et al. | |
| 7,334,029 B2 * | 2/2008 | Shiga et al. | 709/223 |
| 7,398,421 B1 | 7/2008 | Limaye et al. | |
| 2003/0131182 A1 * | 7/2003 | Kumar et al. | 711/5 |
| 2003/0188218 A1 | 10/2003 | Lubbers et al. | |
| 2004/0024964 A1 | 2/2004 | Taninaka et al. | |
| 2004/0054618 A1 | 3/2004 | Chang et al. | |
| 2004/0139240 A1 | 7/2004 | DiCorpo et al. | |

(Continued)

FOREIGN PATENT DOCUMENTS

EP   1130514 A2   9/2001

OTHER PUBLICATIONS

Madnani; U.S. Appl. No. 11/241,165, filed Sep. 30, 2005; 49 pages.

(Continued)

*Primary Examiner* — Hassan Phillips
*Assistant Examiner* — Eunsook Choi
(74) *Attorney, Agent, or Firm* — Guerin & Rodriguez, LLP

(57) ABSTRACT

Failover is provided from a primary Fiber Channel device to a secondary Fiber Channel device. Source and secondary Fiber Channel devices are coupled to a Fiber Channel fabric having a database that associates Fiber Channel names and Fiber Channel addresses of Fiber Channel ports coupled to it. All data is copied from the primary Fiber Channel device to the secondary Fiber Channel device. In response to a failure, secondary port names and LUN names are replaced with the primary port names and LUN names, and the fabric updates its database so that the database associates the secondary port and LUN addresses with the primary port and LUN names. The secondary Fiber Channel device thereby assumes the primary Fiber Channel device's identity.

47 Claims, 30 Drawing Sheets

U.S. PATENT DOCUMENTS

| | | |
|---|---|---|
| 2004/0151188 A1* | 8/2004 | Maveli et al. .................. 370/398 |
| 2004/0250021 A1* | 12/2004 | Honda et al. .................. 711/114 |
| 2005/0010688 A1 | 1/2005 | Murakami et al. |
| 2005/0108476 A1 | 5/2005 | Tanaka et al. |
| 2005/0193168 A1 | 9/2005 | Eguchi et al. |
| 2005/0243611 A1 | 11/2005 | Lubbers et al. |
| 2005/0251620 A1 | 11/2005 | Matsunami et al. |
| 2006/0041595 A1 | 2/2006 | Taguchi et al. |
| 2006/0047930 A1 | 3/2006 | Takahashi et al. |
| 2006/0064466 A1* | 3/2006 | Shiga et al. .................. 709/214 |
| 2006/0072580 A1* | 4/2006 | Dropps et al. ............. 370/395.7 |
| 2006/0085607 A1 | 4/2006 | Haruma |
| 2006/0107010 A1* | 5/2006 | Hirezaki et al. .............. 711/165 |
| 2006/0129772 A1* | 6/2006 | Kawamura et al. ........... 711/162 |
| 2006/0168415 A1* | 7/2006 | Ishii et al. ...................... 711/165 |
| 2006/0182050 A1 | 8/2006 | Dohm |
| 2006/0242377 A1 | 10/2006 | Kanie et al. |
| 2007/0220310 A1 | 9/2007 | Sharma et al. |
| 2007/0266212 A1 | 11/2007 | Uchikado et al. |
| 2007/0291785 A1 | 12/2007 | Sharma et al. |
| 2008/0189700 A1* | 8/2008 | Schmidt et al. ................... 718/1 |

OTHER PUBLICATIONS

Ofer, et al.; U.S. Appl. No. 11/427,664, filed Jun. 29, 2006; 76 pages.
Madnani, et al.; U.S. Appl. No. 111427,677, filed Jun. 29, 2006; 75 pages.
Madnani, et al.; U.S. Appl. No. 111427,685, filed Jun. 29, 2006; 74 pages.
Ofer, et al.; U.S. Appl. No. 11/427,699, filed Jun. 29, 2006; 79 pages.
Office Action mailed Aug. 19, 2008 for U.S. Appl. No. 11/241,165.
Office Action mailed Feb. 23, 2009 for U.S. Appl. No. 11/427,664.
Notice of Allowance mailed Sep. 19, 2008 for U.S. Appl. No. 11/427,677.
Notice of Allowance mailed Sep. 24, 2008 for U.S. Appl. No. 11/427,685.
Notice of Allowance mailed Sep. 29, 2008 for U.S. Appl. No. 11/427,699.
Final Office Action mailed Nov. 9, 2009 for U.S. Appl. No. 11/427,664.
Office Action mailed Oct. 2, 2009 for U.S. Appl. No. 11/771,604.
Office Action mailed Oct. 26, 2009 for U.S. Appl. No. 11/771,655.
Final Office Action mailed Jul. 2, 2010 for U.S. Appl. No. 11/771,604.
Final Office Action mailed Sep. 3, 2010 for U.S. Appl. No. 11/771,655.
Office Action mailed Dec. 23, 2010 for U.S. Appl. No. 11/241,165.
Office Action mailed Apr. 25, 2011 for U.S. Appl. No. 11/771,655, 22 pages.

* cited by examiner

| Port Name | Port ID |
|---|---|
| A | 0 |
| B | 1 |
| C | 2 |
| D | 3 |

| LUN Name | Port ID | LUN # |
|---|---|---|
| m | 0 | 40 |
| n | 0 | 41 |
| p | 0 | 42 |
| q | 1 | 50 |
| r | 1 | 51 |
| s | 1 | 52 |
| t | 2 | 60 |
| u | 2 | 61 |
| v | 2 | 62 |
| x | 3 | 70 |
| y | 3 | 71 |
| z | 3 | 72 |

| LUN Name | Port ID | LUN # |
|---|---|---|
| m | 0 | 40 |
| n | 0 | 41 |
| p | 0 | 42 |
| q | 1 | 50 |
| r | 1 | 51 |
| s | 1 | 52 |
| t | 2 | 60 |
| u | 2 | 61 |
| v | 2 | 62 |
| x | 3 | 70 |
| y | 3 | 71 |
| z | 3 | 72 |

Fig. 10

| LUN Name | Port ID | LUN # |
|---|---|---|
| m | 2 | 40 |
| n | 2 | 41 |
| p | 2 | 42 |
| q | 3 | 50 |
| r | 3 | 51 |
| s | 3 | 52 |
| t | 0 | 60 |
| u | 0 | 61 |
| v | 0 | 62 |
| x | 1 | 70 |
| y | 1 | 71 |
| z | 1 | 72 |

| Port Name | new Port name |
|---|---|
| A | C |
| B | D |

| LUN Name | new LUN name |
|---|---|
| m | t |
| n | u |
| p | v |
| q | x |
| r | y |
| s | z |

| LUN number | new LUN number |
|---|---|
| 40 | 60 |
| 41 | 61 |
| 42 | 62 |
| 50 | 70 |
| 51 | 71 |
| 52 | 72 |

| Port Name | new Port name |
|---|---|
| C | A |
| D | B |

| LUN Name | new LUN name |
|---|---|
| t | m |
| u | n |
| v | p |
| x | q |
| y | r |
| z | s |

| LUN number | new LUN number |
|---|---|
| 60 | 40 |
| 61 | 41 |
| 62 | 42 |
| 70 | 50 |
| 71 | 51 |
| 72 | 52 |

Fig. 21

FULL ARRAY NON-DISRUPTIVE FAILOVER

PRIORITY STATEMENT

This application is a continuation-in-part of, and claims the filing date benefit of, U.S. patent Ser. No. 11/241,165, "Full Array Non-Disruptive Data Migration", filed Sep. 30, 2005 now U.S. Pat. No. 8,072,987.

FIELD OF THE INVENTION

The present invention relates generally to the field of storage systems, and particularly to failover of an existing storage array to a new storage array.

BACKGROUND OF THE INVENTION

Today's enterprise data centers store ever-larger amounts of business critical data that must be immediately and continuously available, and highly reliable. Any down time for a storage system is considered unacceptable. Many precautions are taken in storage systems to protect against the effects of failures so that down time is avoided. However, from time to time a storage system, such as a storage array, must be upgraded or replaced.

In order to replace a current storage array with a new storage array, all the data and connections on the current storage array must be migrated to the new array. Then the storage system requires re-initialization, and host systems must be reconfigured. This requires at least some down time to complete; thus, host applications lose access to the storage array for some amount of time. Interruption of critical applications is unacceptable.

What is needed is a way to upgrade or replace storage arrays in a manner that is transparent to the host systems so that host applications are not interrupted by the upgrade or replacement. It is further desirable to perform failover between storage arrays in such a transparent manner.

SUMMARY OF THE INVENTION

In accordance with the principles of the invention, in the event of a failure, a storage array can be replaced with a new storage array in a manner that is transparent to host applications. The invention is designed for use in a system that employs a transport protocol for transferring information between devices. Each device has one or more device ports. Each device port has a unique name associated with it, and an address that is used for routing information between the devices. An example of such a transport is Fibre Channel, commonly used in storage systems for communications between hosts and storage arrays.

According to the invention, a Fibre Channel fabric has a database that associates Fibre Channel names and Fibre Channel addresses of Fibre Channel ports coupled to it. In accordance with the invention, a primary Fibre Channel device has one or more primary ports coupled to the Fibre Channel fabric, each primary port having a primary port name and a primary port address. A secondary Fibre Channel device has one or more secondary ports coupled to the Fibre Channel fabric, each secondary port having a secondary port name and a secondary port address. The invention employs logic for copying all data resident on the primary Fibre Channel device to the secondary Fibre Channel device. The invention further includes logic responsive to a failure for replacing the secondary port names with the primary port names, and causing the fabric to update its database so that the database associates primary port names with the secondary port addresses, such that the names known by the host have not changed and the secondary Fibre Channel device now appears to the host as the primary Fibre Channel device.

The primary and secondary Fibre Channel devices are preferably storage arrays. The primary storage array exports primary LUNs. Each primary LUN has a primary LUN name and primary LUN number. The secondary storage array exports secondary LUNs, each secondary LUN having a secondary LUN name and a secondary LUN number. The logic for replacing further includes logic for replacing the secondary LUN names with the primary LUN names. Secondary LUN numbers are replaced with primary LUN numbers in a similar manner.

By replacing port names and LUN names and numbers, a source array fails over to a destination array in a manner transparent to the hosts and applications.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 3 is a representation of a name server database table resident in the fabric.

FIG. 4 is a representation of the mapping of LUNs to a group of disks.

FIG. 10 is a representation of a LUN table before the LUN names are exchanged between the arrays.

FIG. 11 is a representation of a LUN table after the LUN names are exchanged between the arrays.

FIG. 15 is an example of a port name translation table in the source array.

FIG. 16 is an example of a LUN name translation table in the source array.

FIG. 17 is an example of a LUN number translation table in the source array.

FIG. 19 is an example of a port name translation table in the destination array.

FIG. 20 is an example of a LUN name translation table in the destination array.

FIG. 21 is an example of a LUN number translation table in the destination array.

DETAILED DESCRIPTION OF EXEMPLARY EMBODIMENTS

Figure 1:
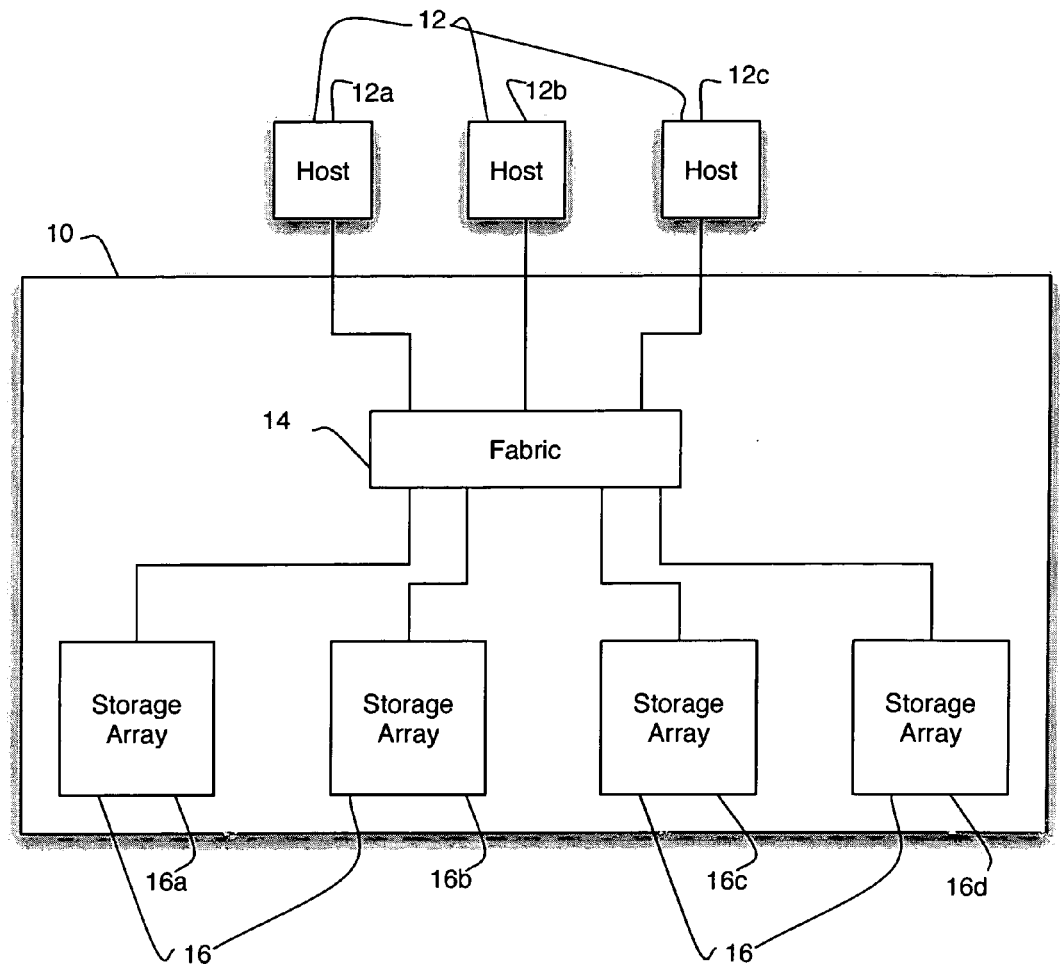
FIG. 1 is a representation of a storage area network and hosts. The storage area network includes multiple Fibre Channel arrays coupled to a Fibre Channel fabric.

In FIG. 1 there is shown a functional block diagram of an exemplary storage area network 10 in which the invention can be implemented. The storage area network 10 employs a Fibre Channel fabric topology. Fibre Channel is a high speed serial transport used in storage systems. It is described in a series of standards that can be found at X3T9.3 *Task Group of ANS1: Fibre Channel Physical and Signaling Interface (FC-PH)*, Rev. 4.2 Oct. 8, 1993. Hosts 12, shown individually as 12a, 12b, and 12c are coupled to a Fibre Channel "fabric" in the storage system, herein shown as a switch 14. Storage arrays 16, shown individually as 16a-d, are also coupled to the switch 14. The hosts 12 communicate with any of the arrays 16 via a cross-point Fibre Channel connection through the switch 14.

Figure 2:
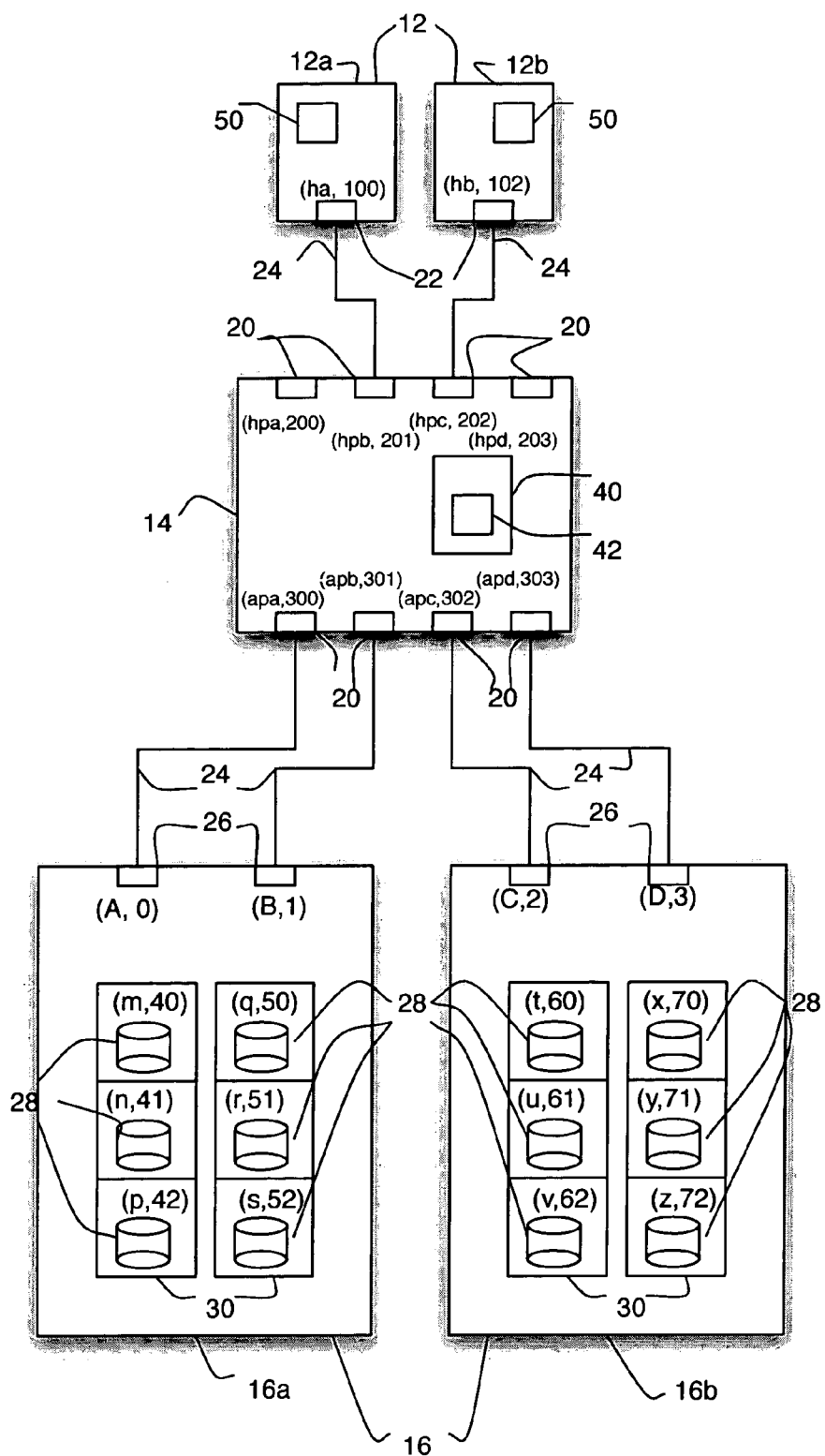
FIG. 2 is a representation of the storage area network of FIG. 1, showing two hosts, the fabric, and two storage arrays in more detail.

In FIG. 2 the hosts 12a,b, the arrays 16a,b, and the switch 14 are shown in more detail. The switch includes switch ports 20. Host ports 22 on the hosts are coupled via Fibre Channel links 24 to host-facing switch ports 20 on the switch 14. Array ports 26 on the arrays 16 are coupled via Fibre Channel links 24 to array-facing switch ports 20 on the switch 14. Within each array 16 are arrays of disks 28. The disks are arranged into LUNs 30. The LUNs are exported by the arrays 16 for access by the hosts 12 via the Fibre Channel links 24 and switch 14. As herein shown, each disk is configured as a separate LUN, though it is understood that a LUN can encompass part of a disk, or parts of multiple disks, or multiple complete disks. The arrangement shown is chosen for convenience of description.

In a Fibre Channel system such as that of FIG. 2, each Fibre Channel device (including but not limited to host ports, array ports, and LUNs) has two identifying characteristics—a name and an address. Fibre Channel names, known as "world wide names", are unique—every Fibre Channel device in the world has its own unique name. Each Fibre Channel device in a system also has an address, referred to in Fibre Channel parlance as an "ID", that is dynamic and dependent upon the configuration of the system. The IDs are used for directing information between hosts and arrays and LUNs in the system. Port addresses are commonly referred to as "port IDs". After initialization, the hosts 12 communicate with the arrays 16 and LUNs 30 by sending messages to the appropriate port and LUN addresses. The hosts adapt to new addresses, but devices in use must maintain the same name in order for uninterrupted communications to continue.

In a Fabric topology, the switch assigns IDs to the host ports 22 and array ports 26 during initialization. IDs as described in the Fibre Channel specification are 24 bit quantities containing several fields. For purposes of this description, it is sufficient to understand that the ID assigned to an array port 26 is a derivative of the switch 14 name and the switch port 20 ID. Thus an array port 26 name depends on the switch port 20 to which it is coupled. In the Figures the names and IDs are shown symbolically with alphanumeric symbols for simplicity of explanation. In FIG. 2, the names and IDs of each port and LUN are shown as a pair (name, ID). Each host port 22 is shown to have a name and an ID (ha, 100) and (hb, 102). The host-facing switch ports 20 are shown to have names and IDs (hpa, 200), (hpb, 201) coupled to a host port 22 on the host 16a, (hpc, 202) coupled to a host port 22 on the host 16b, and (hpd, 203). Array-facing switch ports 20 also have a name and M. The array-facing switch ports 20 are shown to have names and IDs (apa, 300) coupled to an array port 26 on the array 16a, (apb, 301) coupled to an array port 26 on the array 16a, (apc, 302) coupled to an array port 26 on the array 16b, and (apd, 303), coupled to an array port 26 on the array 16b. Each array port 26 is also shown to have a name and an ID. The array 16a includes array ports 26 having names and IDs (A,0) and (B,1). The array 16b includes array ports 26 having names and IDs (C,2) and (D,3). Each LUN 30 in each array also has a name and a LUN number, referred to as a name/number pair (LUN name, LUN number). The array 16a includes LUNs (m,40), (n,41) and (p,42) accessible via port (A,0), and LUNs (q,50), (r,51) and (s,52) accessible via port (B,1). The array 16b includes LUNs (t,60), (u,61) and (v,62) accessible via port (C,2), and LUNs (x,70), (y,71) and (z,72) accessible via port (D,3). It is noted that some LUNs may have more than one LUN number, for purposes of LUN access by multiple hosts via multiple array ports. However, for clarity of the present description, each LUN has one LUN number.

The Fibre Channel switch 14 includes a name server database 40. The name server database 40 is used by the switch 14 to assign IDs to host ports 22 and array ports 26 during initialization. The name server database 40 includes a name server table 42 that is used by the switch to resolve IDs to names. An example of the name server table 42 is shown in more detail in FIG. 3. The full contents of the name server table 42 are described in the Fibre Channel Name Server MIB, described in the IETF RFC 4044, "Fibre Channel Management MIB", herein incorporated by reference. FIG. 3 shows only enough of the table 42 to contribute to understanding of the invention. The table 42 includes multiple entries 44, each including a port name field 46 and a port address field 48. During initialization, a Fibre Channel device attached to a switch port, for example the array 16a, sends its array port 26 names to the switch 14. In response, the name server database 40 sends an ID for each array port 26 to the array 16a. The name server database 40 stores each array port name and corresponding ID in an entry 44 in the table 42. In FIG. 3, the table 42 includes entries 44 for the port names A and B from the array 16a, and C and D from the array 16b. The IDs 0 and 1 have been assigned to the port names A and B, and the IDs 2 and 3 have been assigned to the port names C and D. After the arrays 16a and 16b are initialized, the switch 14 sends the table 42 to all members of the SAN 10 registered to received state change notifications. This includes the hosts 12. The hosts 12 now have the IDs of the arrays 16 so Fibre Channel communications between the hosts 12 and arrays 16 can ensue.

Now that the hosts have IDs to access the ports, they can learn what LUNs are available. LUN names and numbers are managed at the array level. Each host 12 sends a query to each array port 26 ID in turn, requesting a list of available LUN numbers. Once the LUN numbers for a given array port ID are known, the host is able to query each LUN 30 by using a combination of the port ID and LUN number to access the LUNs. The host 12 then queries each LUN 30 for its corresponding LUN name. Once the host has gathered all this information, it builds a directory LUN table 50 that relates LUN names, port IDs, and LUN numbers. A representation of such a LUN table 50 is shown in FIG. 4. The table includes an entry 52 for each LUN it has discovered. Each entry includes a LUN name field 54, a port ID field 58 and a LUN number field 60, which in combination identify the LUN. In the portion of the table shown, the table 50 for a host 12 includes the LUN names, port IDs, and LUN numbers for the LUNs 30 on the array 16a and the LUNs 30 on the array 16b. For example, the LUNs 30 associated with the array port 26 address 0 are (m, 40), (n, 41), (p, 42).

During operation, hosts refer to LUNs by their LUN numbers. In order to access a LUN 30, a host 12 port 22 sends a message whose Fibre Channel address includes the port ID and LUN number. The switch 14 parses the port ID portion of the address in order to forward the message to the identified array port 26. The array 16 then uses the LUN number portion of the address to access the proper LUN 30 within the array 16. So, for example, if host 12a needs to access LUN #62, the host 12a port 22 sends a message to an address including the port ID 2 and the LUN number 62. The switch 14 sees the port ID 2 and sends the message to the port 26 with ID 2. The array sees the LUN #62 and sends the message from port 2 to LUN 62.

In accordance with the principles of the invention, all the data on one array 16, referred to as the source array, is migrated to another array 16, referred to as the destination array, in a manner transparent to the hosts 12 and any applications hosted thereon. For purposes of example the source array shall be array 16a, and the destination array shall be array 16b. First, remote replication software copies the data from the source array 16a to the destination array 16b and synchronizes the arrays. Then, the Fibre Channel connections for each array 16a, b are exchanged. According to an implementation of the exchange, the array port names and LUN names and numbers are swapped between the arrays, and the swapped array port names and LUN names and numbers are then enabled. In response to the configuration change, the switch 14 builds a new name server database 40 table 42 reflecting the new array port and name associations, and prompts the hosts 12 to upload the new table 42. The hosts 12 then query each of the arrays 16a,b to learn the new LUN name and address associations. The data and connections have thereby been migrated from the source array 16a to the destination array 16b transparently, with no interruption to applications running on the hosts 12. This is because, from the hosts' perspective, though the addresses of the array ports 26 have changed, the array port names and LUN numbers have not.

Figure 5:
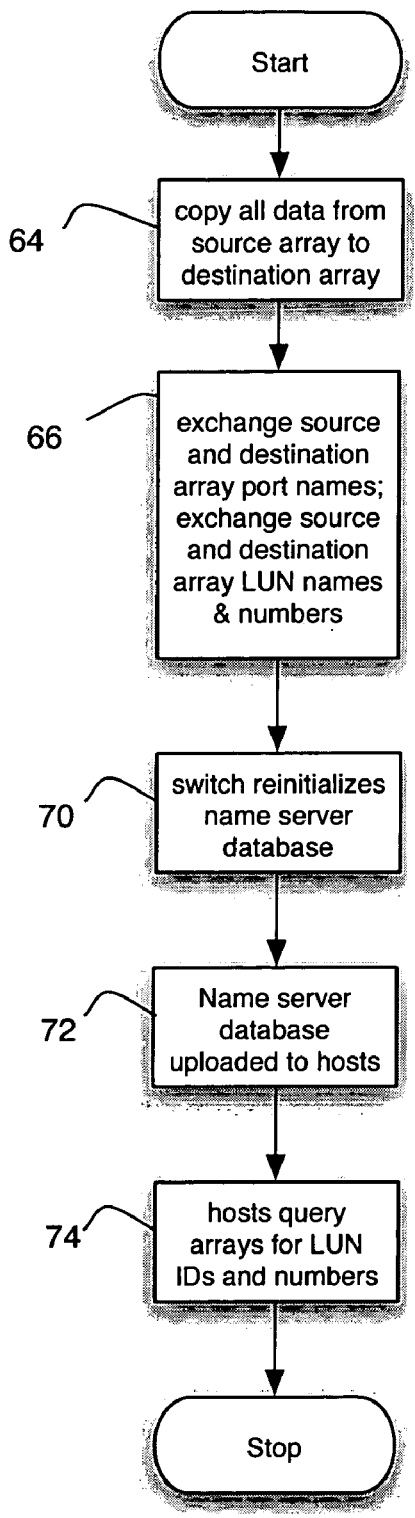
FIG. 5 is a flow diagram representing the high level process of the invention.

The general process by which a complete migration occurs from the source array 16a to the destination array 16b in a manner transparent to the hosts is shown in FIG. 5. First, the data is copied from the source array 16a to the destination array 16b (step 64). Then, the Fibre Channel names of the array ports 26 on the source array 16a are exchanged with the names of the array ports on the destination array 16b, and, the source array LUN names and numbers are exchanged with the destination LUN names and numbers (step 66). Once the port name and LUN name and number exchanges are complete, the switch notes the configuration change and updates its name server database in response (step 70). The hosts upload the updated name server database (step 72). The hosts then query the arrays 16a,b for LUN IDs and LUN names (step 74). As will be shown, from the hosts' perspective, all the LUNs it was able to address previously remain continuously addressable, and no names have changed. In this manner, all the LUNs from the source array 16a have been migrated to the destination array 16b, in a manner transparent to the hosts 12.

Figure 6:
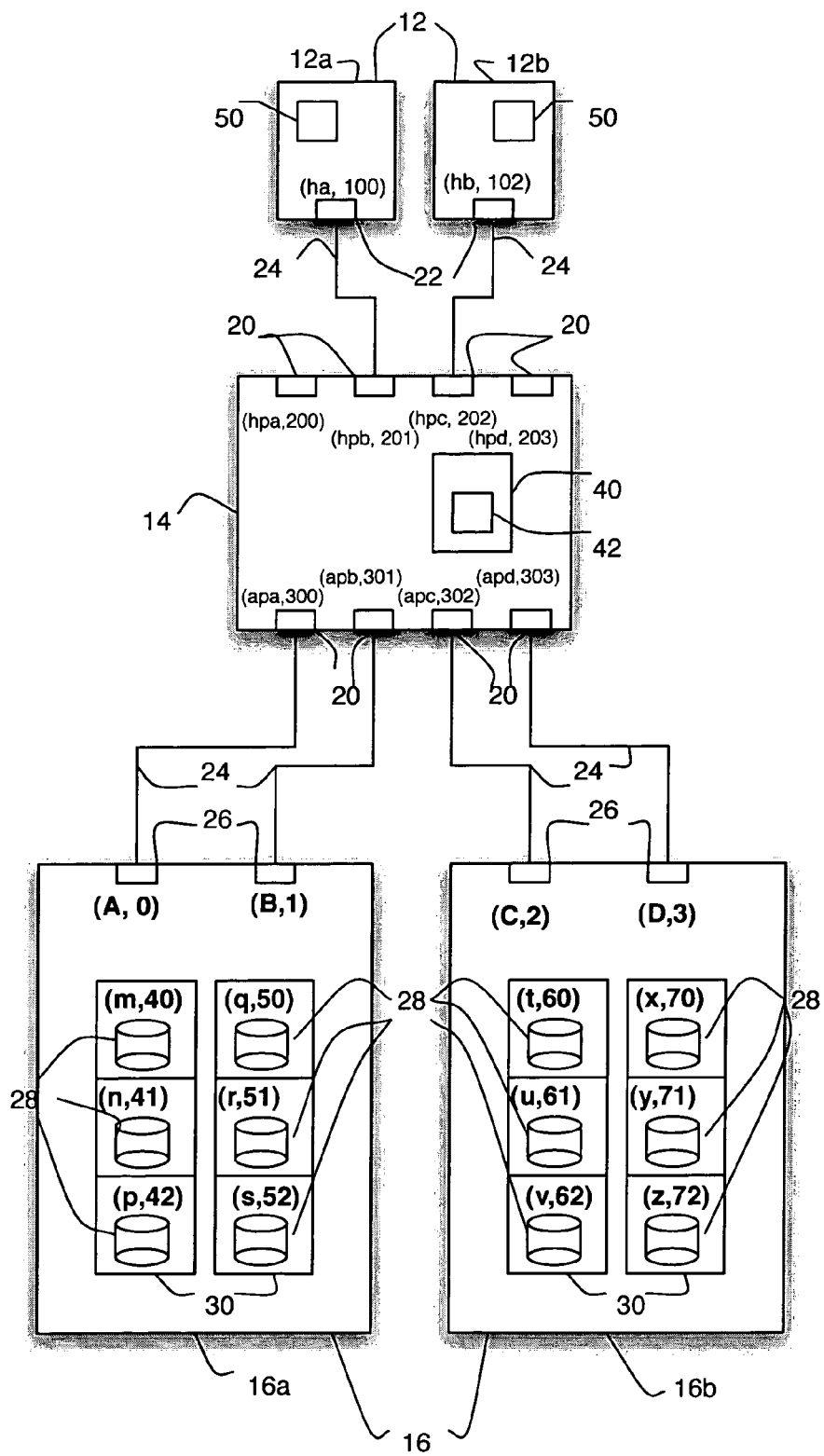
FIG. 6 is a representation of the system of FIG. 2, emphasizing port names and IDs and LUN names and numbers.
Figure 7:
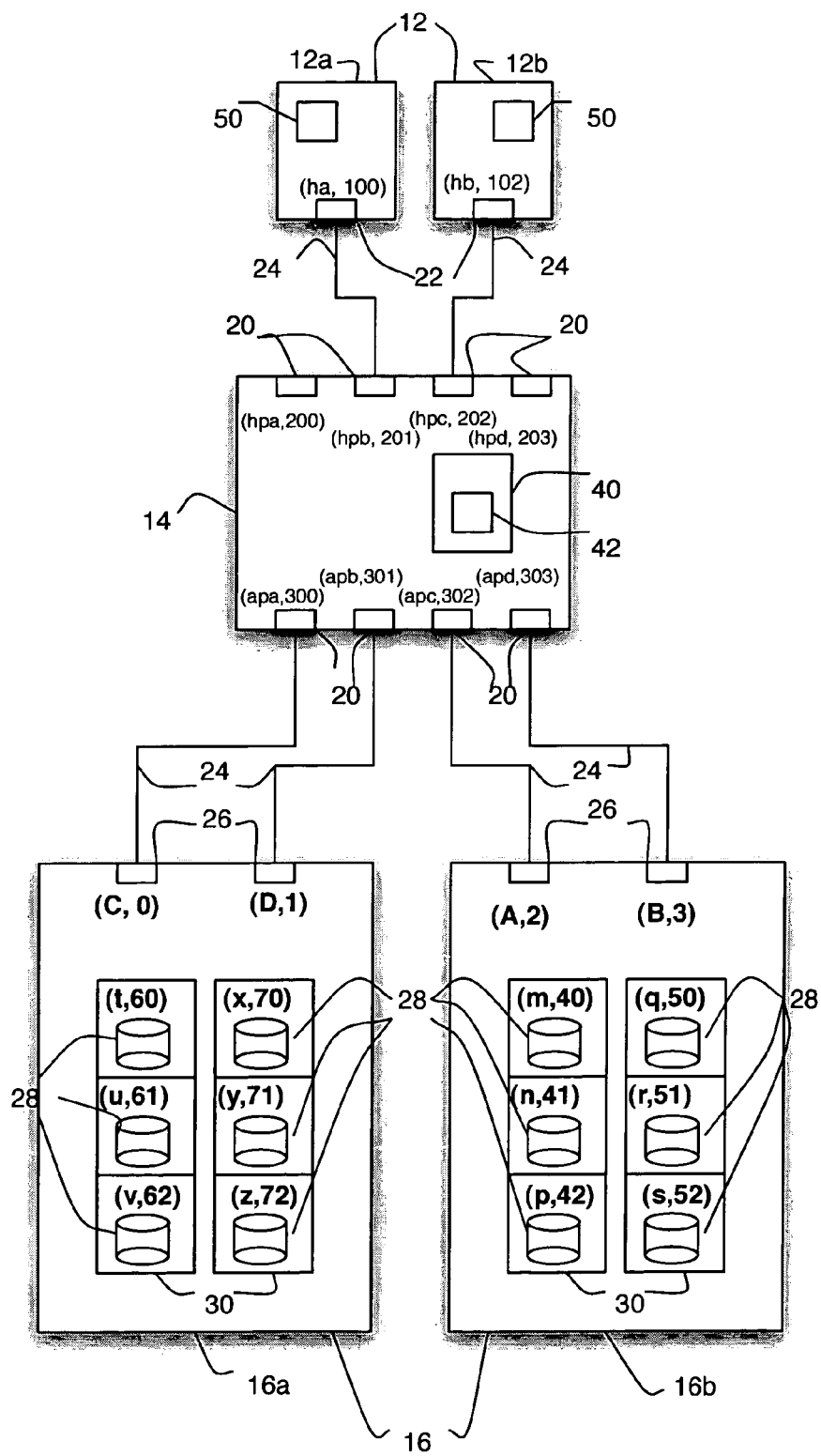
FIG. 7 is a representation of the system of FIG. 6 in which the invention has been employed to exchange port names and LUN names and numbers between arrays.
Figure 8:
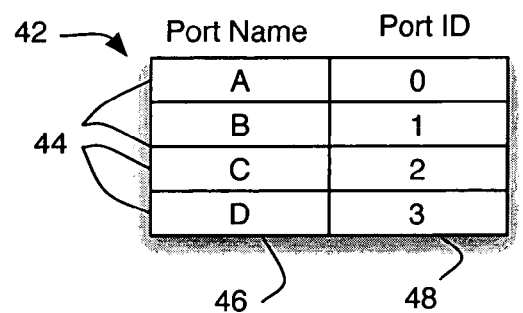
FIG. 8 is a representation of a name server database table before the name and number exchange between the arrays.
Figure 9:
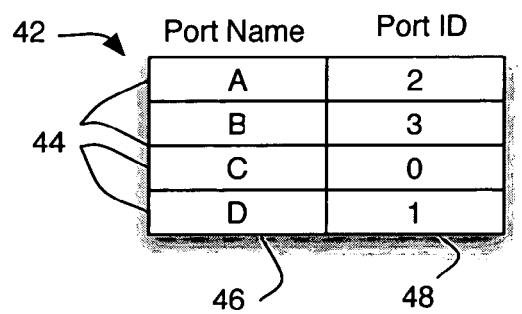
FIG. 9 is a representation of a name server database table after the name and number exchange between the arrays.
Figure 11:
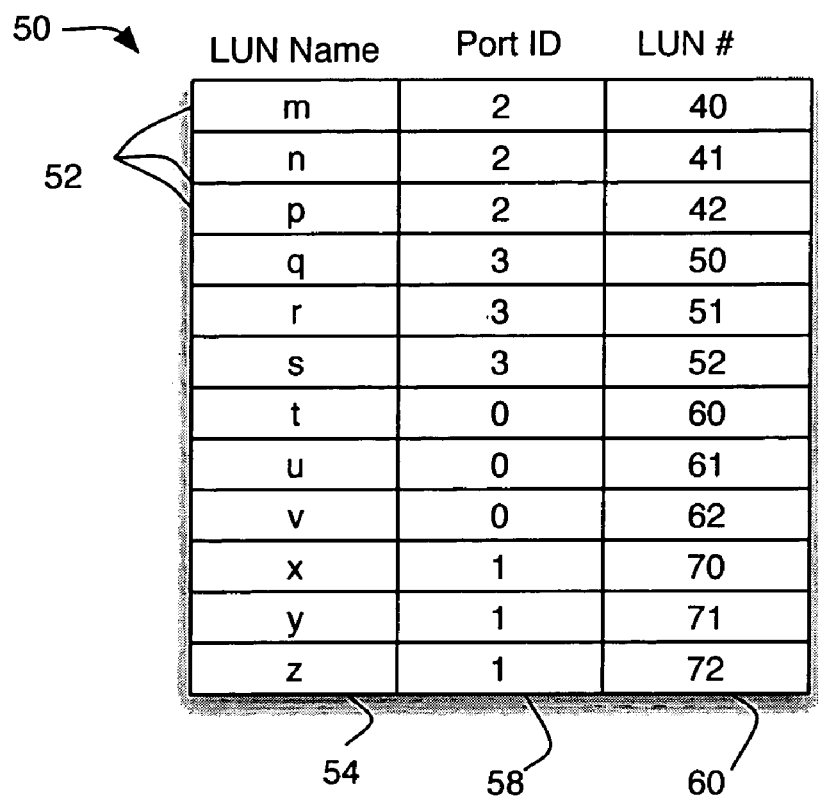

FIGS. 6 and 7 represent the names and IDs of arrays and LUNs before and after a migration. FIGS. 8 and 9 show contents of the name server database table 42 before and after the migration. FIGS. 10 and 11 show contents of the LUN tables 50 in the hosts 12, before and after the migration.

In FIGS. 6 and 7, the system configuration of FIG. 2 is shown, with relevant port and LUN addresses and IDs in bold font. In FIG. 6, the source and destination array port names and IDs and LUN names and numbers are shown before migration. In FIG. 7, they are shown after migration. Note that the array port names and LUN names and numbers have been exchanged between the source array 16a and destination array 16b.

In FIG. 8, the name server database table 42 is shown as it is built by the switch 14 before the migration. In this case, the table 42 associates array port names A, B, C, D with IDs 0, 1, 2, 3 respectively (same as shown in FIG. 3). FIG. 9 shows the table 42 after the name exchange (FIG. 5 step 66). The table 42 now associates the array port 26 names A, B, C, D with IDs 2, 3, 0, 1 respectively.

The updated name server database 40 now prompts the hosts 12 to query the arrays 16 for their LUN information. FIGS. 10 and 11 show examples of LUN tables 50 as built by a host 12 before and after the migration. Before the name exchange, the LUN table 50 associates LUN names with port ID and LUN number pairs as shown in FIG. 10. After the LUN name exchange, the LUN table 50 associates LUN names with port IDs and LUN numbers as shown in FIG. 11. Note that LUN name m now appears on port ID/LUN number (2,40), and LUN name t now appears on port ID/LUN number (0,60).

Figure 12:
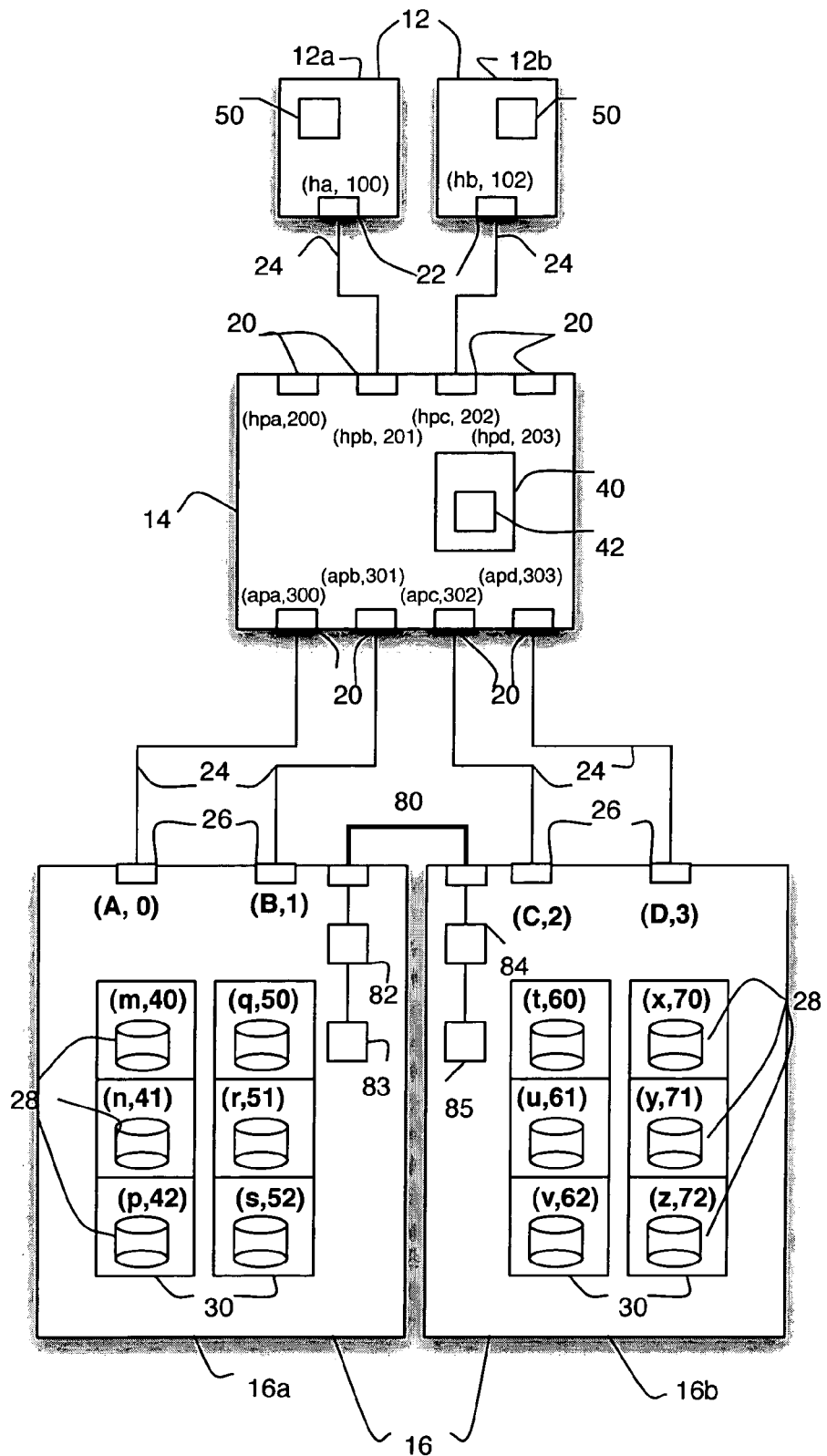
FIG. 12 is a representation of the system of FIG. 6, further showing the source and destination controllers and the translation tables.

An embodiment of the invention is now described in further detail. In FIG. 12, The source and destination arrays 16a and 16b are shown connected by a point-to-point link 80. This link could also pass through the switch 14, but for purposes of simplicity is shown as a simple point-to-point connection between the arrays 16a,b. The link 80 is used for transferring copy data and messages between the arrays 16. The source array 16a is shown to include a source array controller 82 coupled to translation tables 83. The destination array is shown to include a destination array controller 84 coupled to translation tables 85.

The data copy function (FIG. 5 step 64) can be performed by any remote replication software. Data migration products called MirrorView and SRDF/S (Symmetrix Remote Data Facility), both of EMC Corp. of Hopkinton, Mass., are examples of remote replication software that can be conveniently used. The remote replication software sets up a primary mirror, and copies that mirror and all updates to a secondary mirror.

Figure 13:
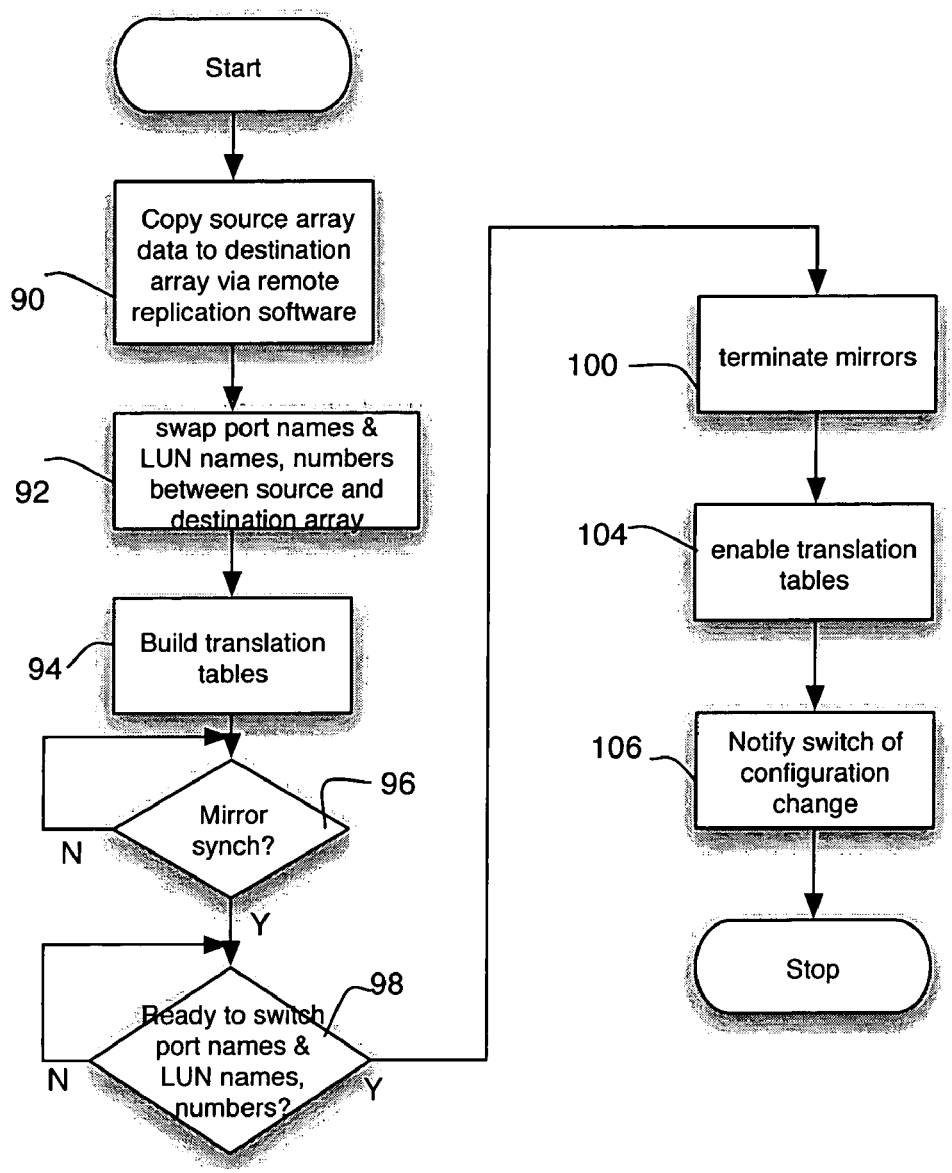
FIG. 13 is a flow diagram of the general operation of the controllers 82 and 84 in combination when port names and LUN names and numbers are exchanged.

The source array controller 82 and destination array controller 84 work together to generally perform the port name and LUN name and ID exchange process (FIG. 5 step 66) shown in FIG. 13. Accordingly, remote replication software is invoked to copy all the source array data to the destination array (step 90) via the dedicated link 80. Meanwhile, array port names, LUN names, and LUN numbers are swapped between the source and destination arrays, also via the link 80 (step 92). Each array 16a,b builds one or more translation tables 83, 85 to map its current port names, LUN names, and LUN numbers to new port names, LUN names, and LUN numbers (step 94). Once the remote replication process indicates synchronization of the arrays (step 96), the arrays perform a handshake function to see whether both arrays are ready to switch their port names and LUN names and numbers (step 98). When both arrays are ready, the mirror process is terminated (step 100). each array's translation tables are then activated (step 104), causing the new port and LUN numbers to be used by the arrays 16 and thereby completing the exchange. The switch 14 is then notified of the configuration change (step 106), causing it to rebuild its name server database table 42. Hosts 12 then upload the new table 42 and proceed to query the arrays 16 for LUN names and LUN numbers to rebuild their LUN tables 50.

In accordance with an embodiment, the configuration change is indicated by causing the switch 14 to recognize a "link bounce". A link bounce causes temporary inaccessibility of the arrays. The link bounce is transparent to the hosts 12. In accordance with Fibre Channel protocol, the switch 14 responds to the link bounce by re-building its name server database table 42 and sending it to all registered SAN devices. A link bounce may be caused for example by quickly disabling and re-enabling a Fibre Channel transmitter. It is understood, however, that the configuration change can be implemented in other manners. For example, the destination array 16b could cause a logout and subsequent login; or, a temporary I/O glitch could be caused. The invention can be implemented using any means for causing the switch to recognize the configuration change.

Figure 14:
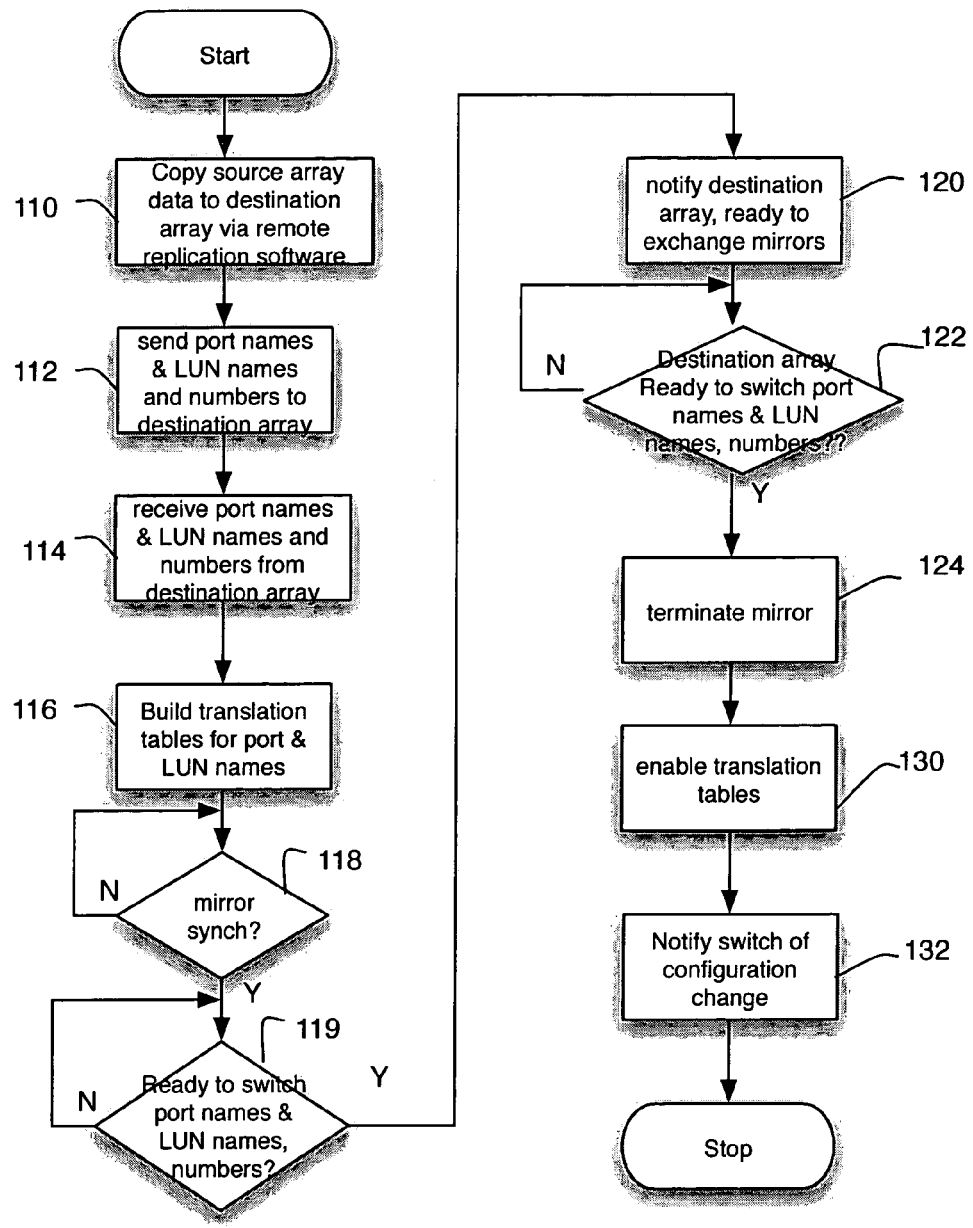
FIG. 14 is a flow diagram of the operation of the source array controller when port names and LUN names and numbers are exchanged.

In the preferred embodiment shown in FIG. 12, the functionality of FIG. 13 is distributed between the source array controller 82 and the destination array controller 84. In FIG. 14, the operation of the source controller 82 is shown. First, the remote replication software is invoked to copy the source array 16a data to the destination array 16b (step 110). While the data is being copied, the controller 82 sends its port names and LUN names and numbers to the destination array 16b controller 84 via the point-to-point link 80 (step 112). The controller is also receiving port names and LUN names and numbers from the destination array (step 114). The source controller 82 uses the port names and LUN names and numbers received from the destination controller 84 to build translation tables 83 for the port names and LUN names and numbers. The translation tables 83 include port name translation table 83a, LUN name translation table 83b, and LUN number translation table 83c. An example of a port name translation table 83a is shown in FIG. 15. The table 83a includes an entry for each port on the array 16a. Each entry contains the current port name, and one of the new port names received from the destination array 16b. Two entries exist in the port name translation table 83a shown in FIG. 15. The first associates the source array port name A with the destination array port name C. The second associates the source array port name B with the destination array port name D. The LUN name translation table 83b includes an entry for each LUN. Each entry includes the current LUN name and a new LUN name received from the destination array 16b. An example of a LUN name translation table is shown in FIG. 16. In this example, six entries exist in the LUN translation table. The current source array LUNs m, n, p, q, r, s are associated with the current destination array LUN names t, u, v, x, y, z. An example of a LUN number translation table is shown in FIG. 16. In this example, six entries exist in the LUN number translation table. The current source array LUN numbers 40, 41, 42, 50, 51, 52 are associated with the current destination array LUN numbers 60, 61, 62, 70, 71, 72 respectively. (It will be clear to the skilled artisan that the information in the tables 83 can be stored as one table, or separate tables, in accordance with design requirements and convenience.)

Referring back to FIG. 14, after the translation tables 83 have been built, the source controller 82 checks to see if the remote replication software has synchronized the two arrays yet (step 118). If no mirror synch signal has been received, the controller 82 waits until mirror synch occurs (step 118). Now, the source controller 82 checks to make sure it is ready to switch its port names and LUN names and numbers (step 119). If ready, the source controller 82 notifies the destination controller 84 that the source controller 82 is ready to switch port and LUN names (step 120), and checks to see if the destination controller 84 is also ready to switch port names and LUN names and numbers (step 122). If not, the controller 82 waits. When the destination array indicates it is ready, the source controller terminates the mirror process (step 124) and enables its port and LUN translation tables (step 130). Now the source array port names, LUN names, and LUN numbers are replaced with the array port names, LUN names and LUN numbers that were received from the destination array 84. A link bounce then occurs to notify the switch of the configuration change (step 132). Now the previously described switch name server database update and host queries occur. The hosts now see the same port names, LUN names, and LUN numbers they saw before, but at different port IDs.

Figure 18:
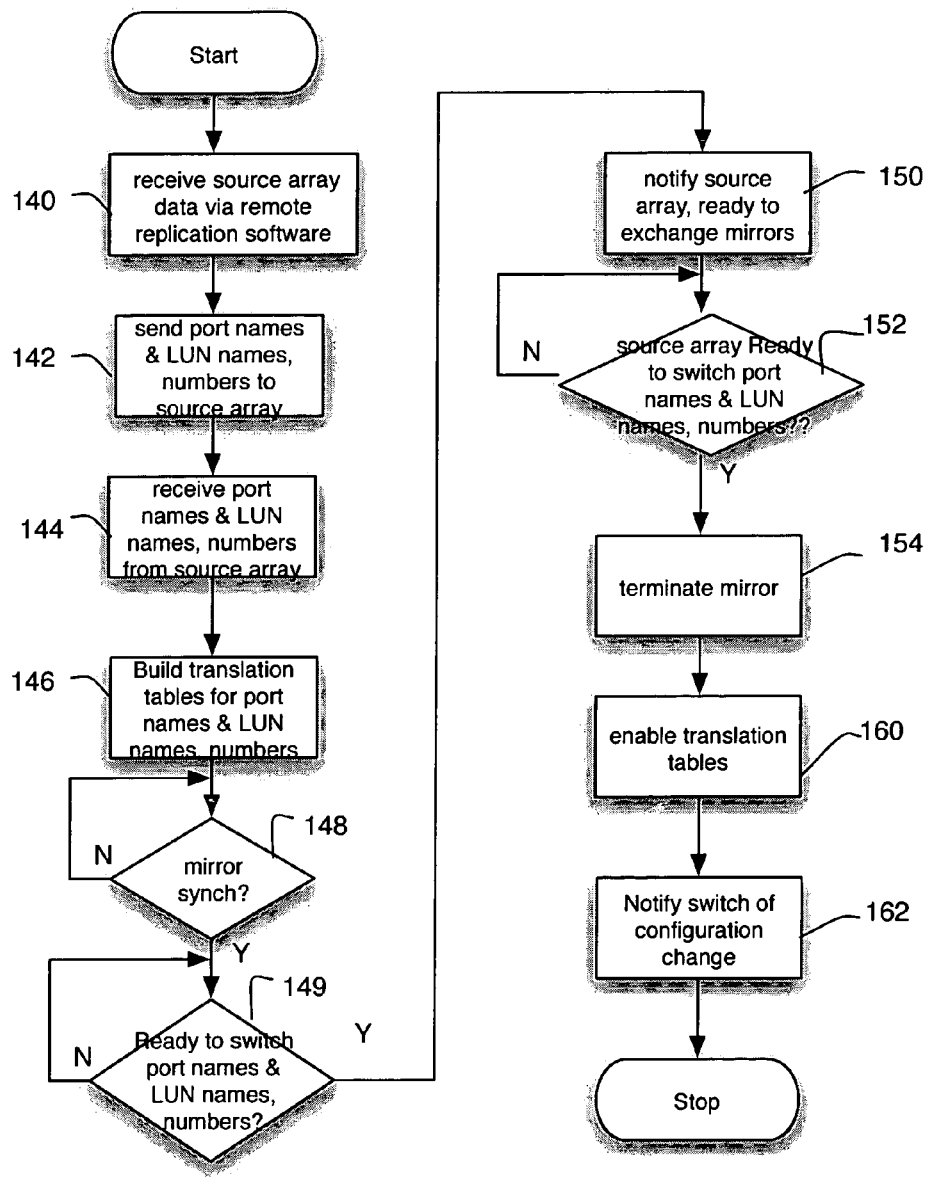
FIG. 18 is a flow diagram of the operation of the destination array controller when port names and LUN names and numbers are exchanged.

In FIG. 18, the operation of the destination controller 84 is shown. First, the remote replication software is invoked to receive the data from the source array (step 140). While the data is being copied, the destination controller 84 sends it port names, LUN names, and LUN numbers to the source array 16a via the point-to-point link 80 (step 142). The controller 84 is also receiving port names, LUN names, and LUN numbers from the source array 16a controller 82 via the link (step 144). The destination controller 84 uses the port names, LUN names, and LUN numbers received from the source array controller 82 to build translation tables 85 for the port names, LUN names, and LUN numbers. An example of a port name translation table 85a is shown in FIG. 19. The table includes an entry for each port on the array 16b. Each entry contains the current port name, and one of the new port names received from the source array. In this example, two entries exist in the port translation table 85a. The first associates the destination array port name C with the source array port name A. The second associates the destination array port name D with the source array port name B. The LUN name translation table 85b includes an entry for each LUN. Each entry includes the current LUN name and a new LUN name received from the source array. An example of a LUN name translation table 85b is shown in FIG. 20. In this example, six entries exist in the LUN name translation table 85b. The current destination array LUNs t, u, v, x, y, z are associated with the current source array LUN names m, n, p, q, r, s. The LUN number translation table 85c also includes an entry for each LUN. Each entry includes the current LUN number and a new LUN number received from the source array. An example of a LUN number translation table 85c is shown in FIG. 21. In this example, six entries exist in the LUN name translation table 85c. The current destination array LUNs 60, 61, 62, 70, 71 and 72 are associated with the current source array LUN numbers 40, 41, 42, 50, 51, 52 respectively.

Figure 22:
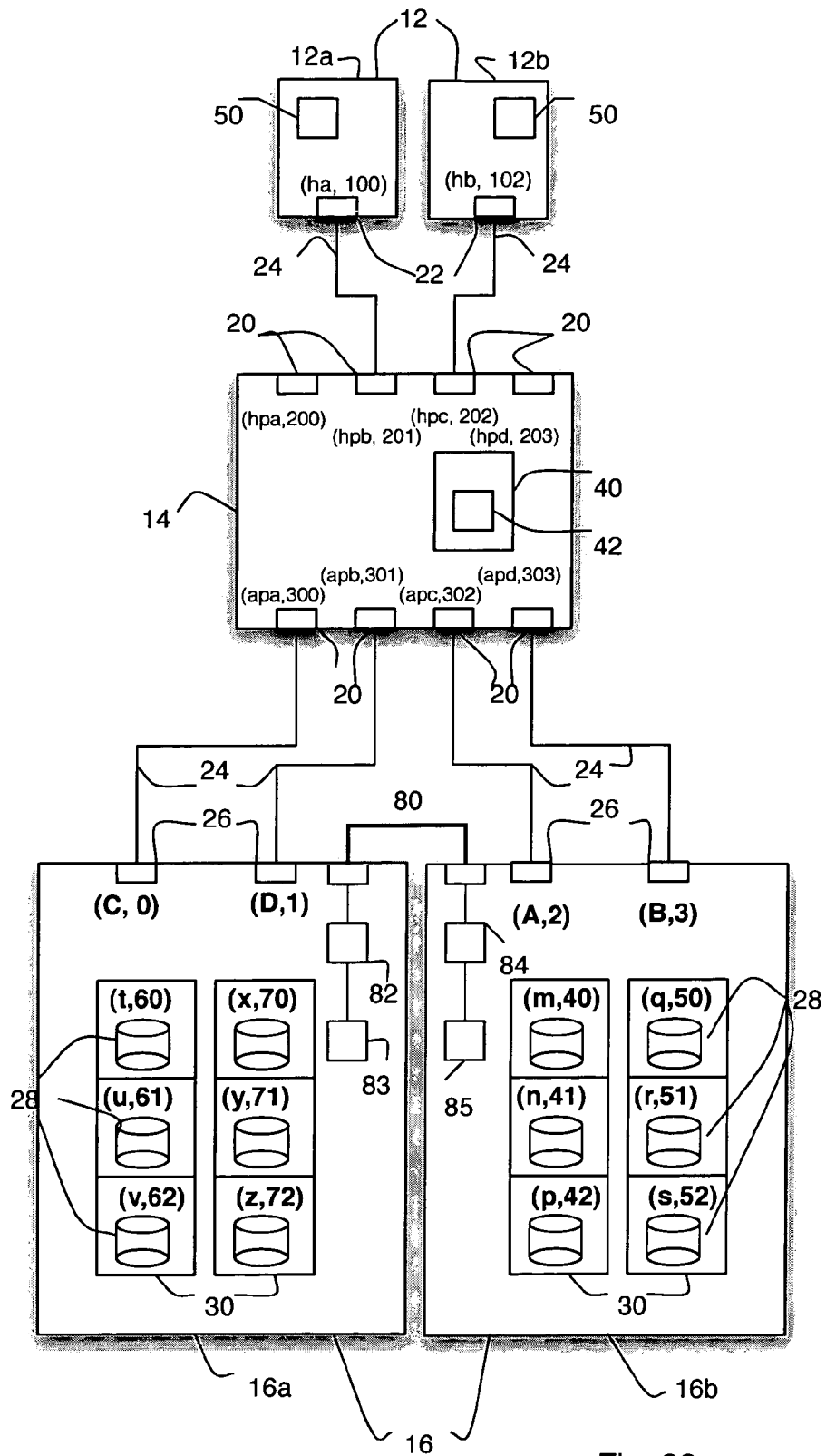
FIG. 22 is a representation of the system of FIG. 12 after the port and LUN names have been exchanged between the arrays.

Referring back to FIG. 18, after the translation tables have been built, the destination controller 84 checks to see if the remote replication software has synchronized the two arrays yet (148). If no mirror synch signal has been received, the controller 84 waits until mirror synch occurs (step 148). Now the destination controller 84 checks to see if it is ready to switch port names and LUN names and numbers (step 149). If so, the controller 84 notifies the source controller 82 that the destination controller 84 is ready to exchange port names and LUN names and numbers (step 150), and checks to see if the source array controller 82 is also ready to switch port and LUN names and LUN numbers (step 152). If not, the controller 84 waits. When the source array indicates it is ready, the destination controller terminates the mirror process (step 154) and enables its port and LUN translation tables (step 160). Now the destination array port IDs and LUN names and numbers are replaced with the array port IDs and LUN names and numbers that were received from the source array. A link bounce then occurs to notify the switch of the configuration change (step 162). Now the previously described switch name server database update and host queries occur. The hosts 12 now see the same LUNs they saw before, but at different port IDs. The storage system configuration now seen by the hosts is shown in FIG. 22. The destination array 16b is now seen by the host as the source array.

Now that the source array has been migrated to the destination array, the array 16a can continue in its current configuration as a secondary mirror, or its LUNs can be presented to the hosts 12 as new LUNs.

FIGS. 14 and 18 set forth one of many possible embodiments for controlling the copy function and name and number exchange functions. The actions need not necessarily be performed in the order shown. For example, the array controllers 82 and 84 could wait until the remote replication process is synchronized before name and number exchanges occur. Furthermore, instead of using translation tables to implement the name and number switch, the names of the ports and LUNs could simply be replaced. The invention encompasses all the various ways of performing the copy and name and number exchange functions. The arrays 16a and 16b have been presented as identical—that is, they have the same number of ports, and the same number and configuration of LUNs. This is preferable. A destination array that is larger, or a superset, of the source array could also be employed. This is one manner in which to upgrade array capacity.

Furthermore, in some implementations it is not necessary to exchange the LUN numbers between the source and destination arrays 16a and 16b. Some remote replication software applications (for example Mirror View) provide the required LUN number information. In this case, only the LUN names need be exchanged. The prior description describes the exchange of both LUN names and LUN numbers for completeness, with the understanding that the invention may be implemented by exchange of port and LUN names only.

Figure 23:
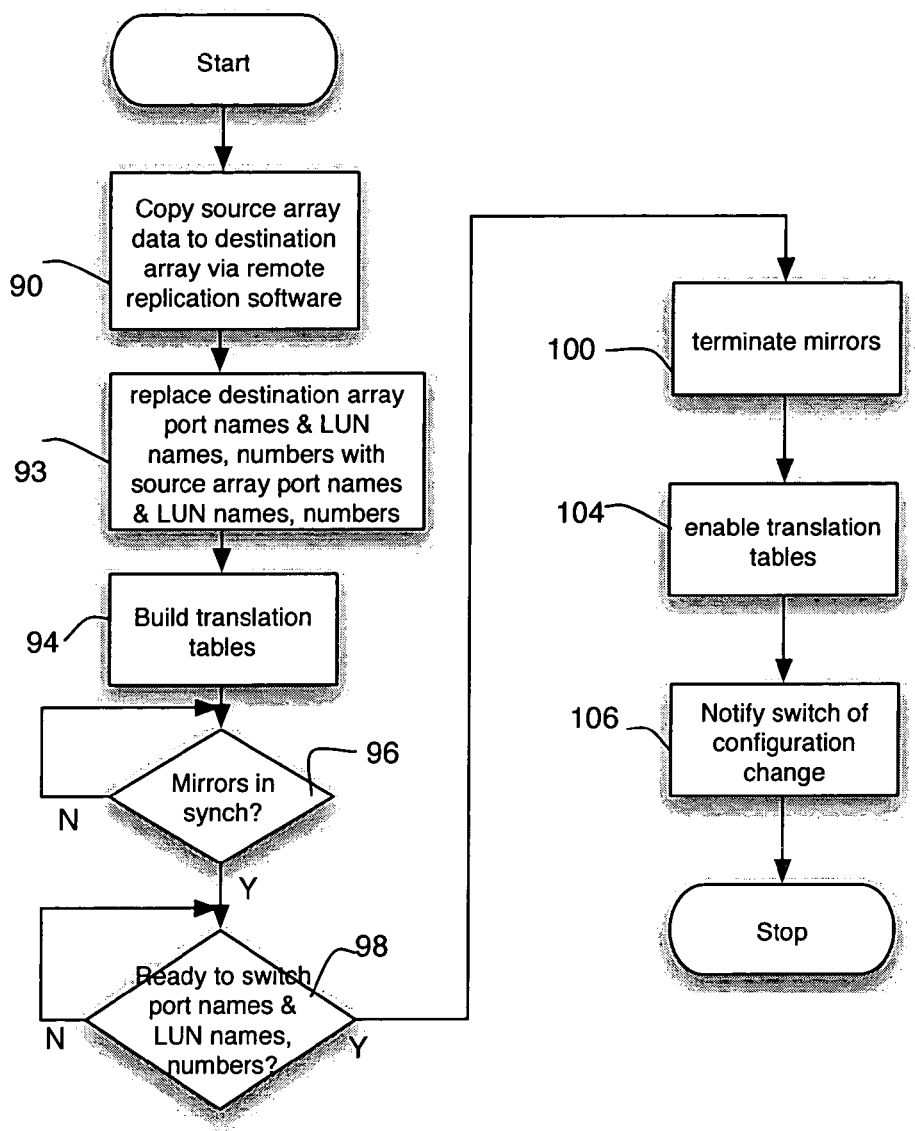
FIG. 23 is a flow diagram of the general operation of the source and destination array controllers when destination port names and LUN names and numbers are replaced with source names and LUN names and numbers.
Figure 24:
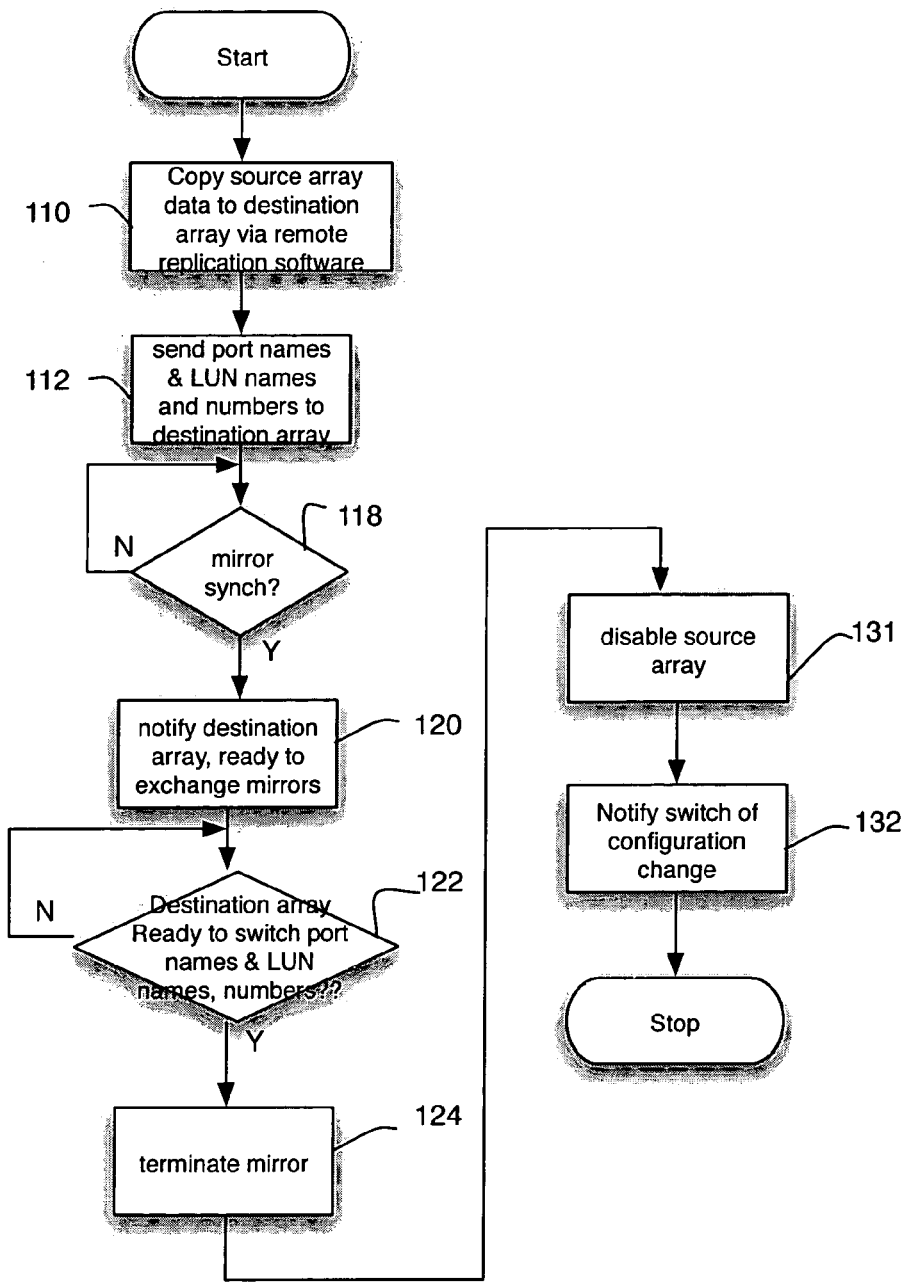
FIG. 24 is a flow diagram of the operation of the source array controller when port names and LUN names and numbers are replaced.
Figure 25:
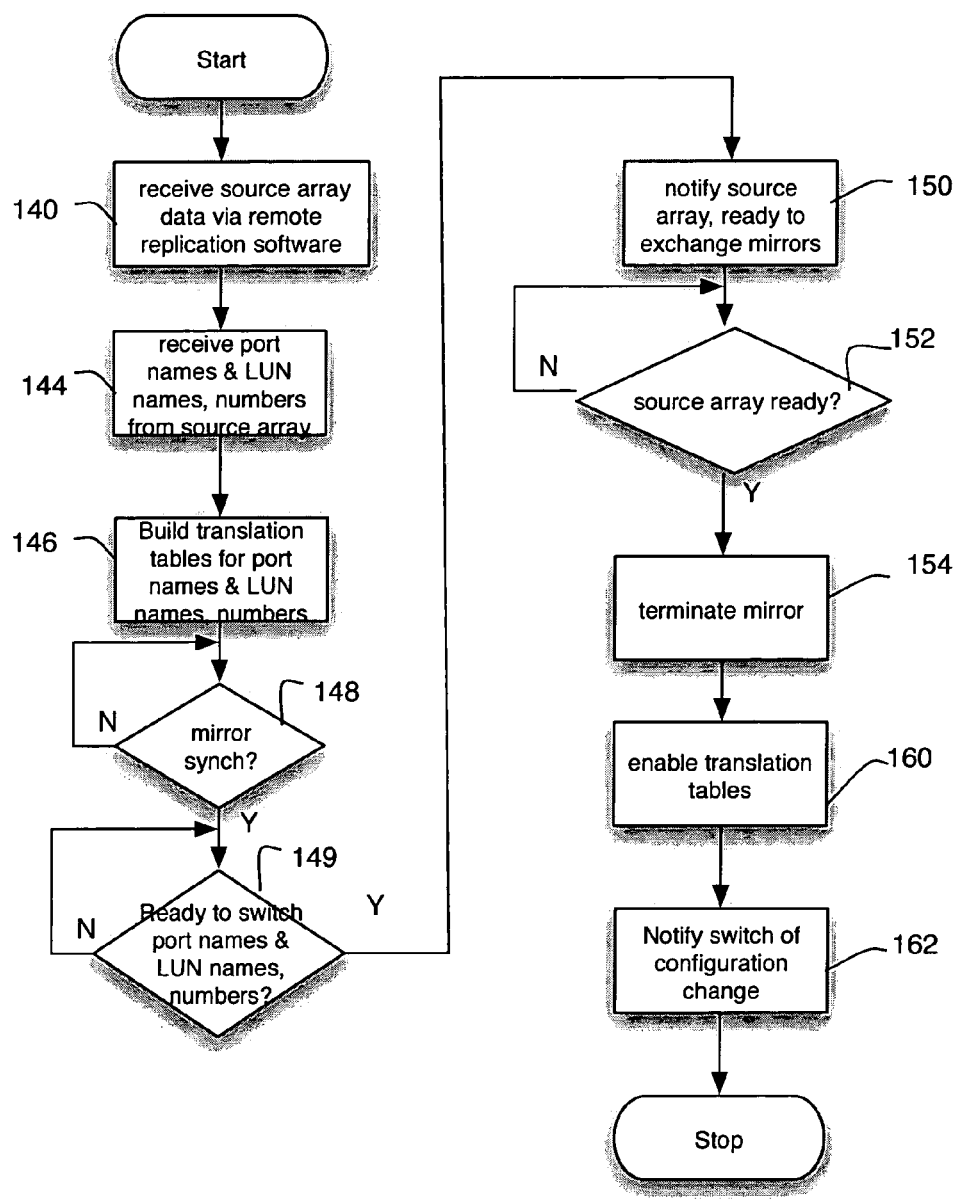
FIG. 25 is a flow diagram of the operation of the destination array controller when port names and LUN names and numbers are replaced.
Figure 26:
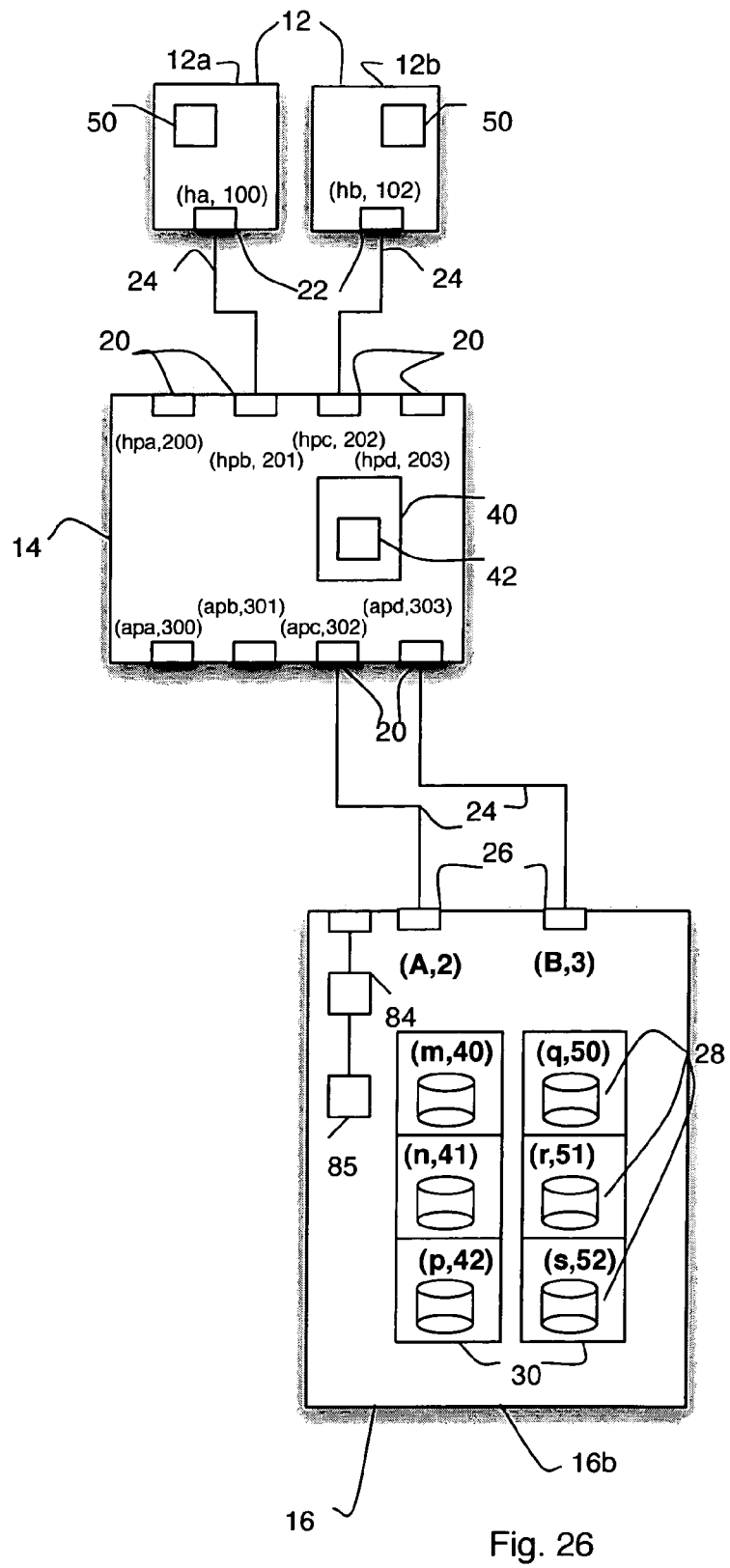
FIG. 26 is a representation of the system of FIG. 12 after the destination port names and LUN names have been replaced with the source port names and LUN names and numbers and the source array has been disabled.

Furthermore, it may be advantageous to simplify the processes of FIGS. 13, 14 and 18 to just copy the source array data to the destination array, and then replace the destination array port names and LUN names and numbers with the source array LUN names and numbers. In this case, after the link bounce, the destination array appears as the source array, and the source array either disappears or is reinitialized as a new array. One example of such an implementation is shown in FIGS. 23-26. In FIG. 23, an example of the general operation of the migration process is shown. FIG. 23 differs from FIG. 13 in that step 92 has been replaced with step 93. Rather than exchanging port names and LUN names and numbers, destination port names and LUN names and numbers are replaced with source port names and LUN names and numbers. In FIG. 24, one possible example of alternate operation of the source array controller 82 is shown. FIG. 24 differs from FIG. 14 in that steps 114, 116, and 119, have been eliminated. Step 130 has been replaced with step 131, which now disables the source array 16a instead of enabling the translation table 83. In FIG. 25, the operation of the destination array controller 84 is shown. FIG. 25 differs from FIG. 18 in that step 142 has been eliminated. In FIG. 26, the resulting system 10 is shown wherein the array 16b now appears as the original array 16a, and the array 16a has disappeared. Again, rather than disappearing, the array 16a may be re-programmed as a new array.

In accordance with a further aspect of the invention, failover between virtual arrays can be accomplished via the migration mechanism previously described. For a given storage array, a backup storage array can be provided. The protected array is referred to as a "primary" array. The backup array is referred to as a "secondary" array. If a failure occurs within a primary array, such as a disk failure that affects a LUN in the primary array, the primary array can be migrated automatically to the secondary array in a manner transparent to the hosts and applications.

Figure 27:
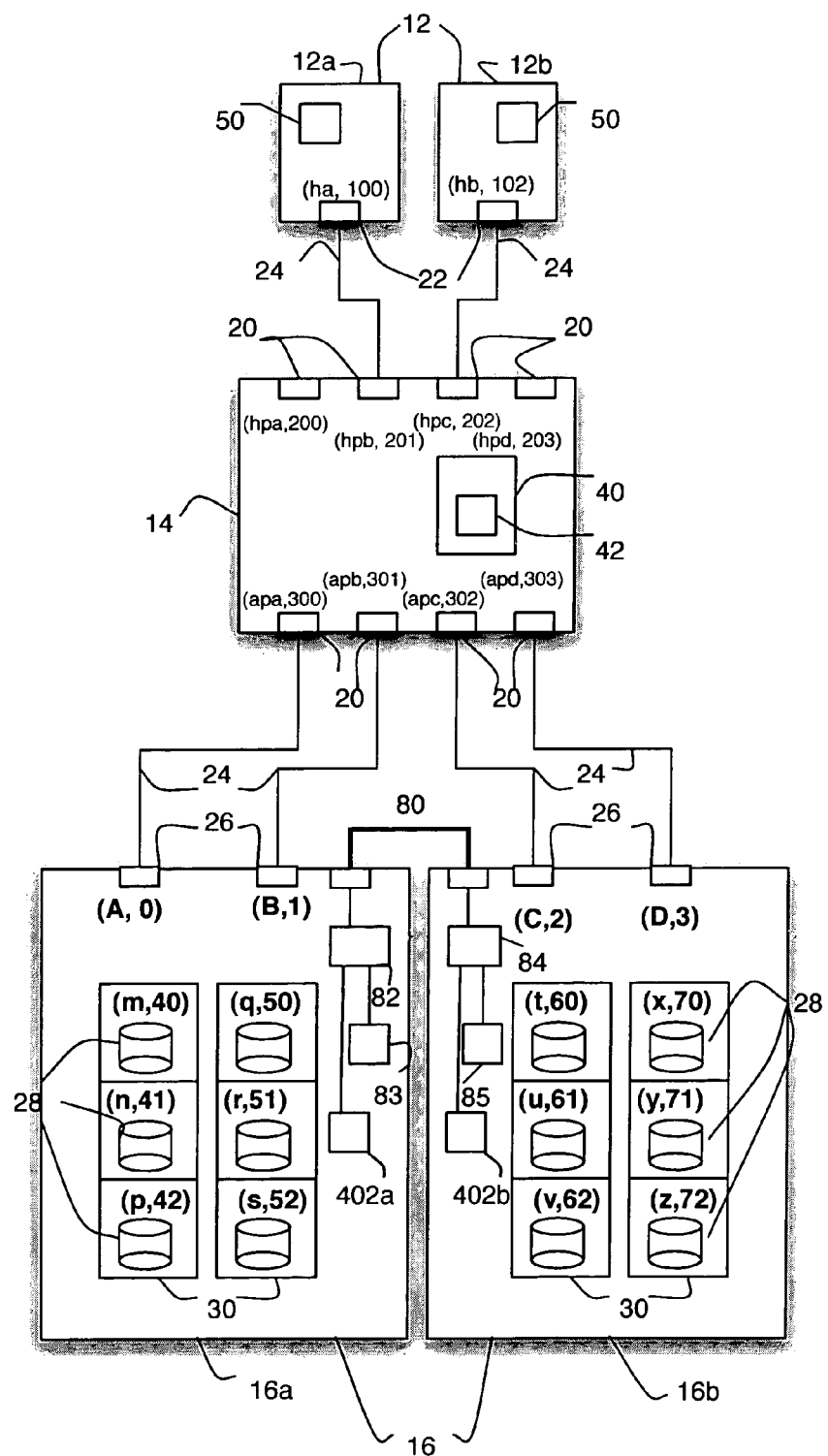
FIG. 27 is a representation of the system of FIG. 12 further including failure databases in each array.
Figure 28:
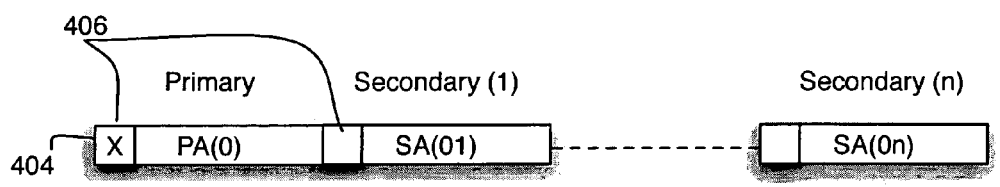
FIG. 28 is a general representation of a failure database.

In FIG. 27 there is shown the system of FIG. 12, wherein the array 16a further includes failover database 402a. Likewise, the array 16b includes failover database 402b. Each failover database 402a, 402b includes a list of all secondary arrays that are backing up the primary array. The failover databases 402a, 402b are preferably stored in non-volatile memory so that they are not affected by array failures. A general example of a failover database is shown in FIG. 28. The failover database includes an entry 404. The entry 404 includes a primary array identifier (such as PA(0)) and one or more secondary array identifiers (such as SA(01)). Each primary and secondary array identifier in a given entry 404 has associated with it an ownership bit 406. The ownership bit 406 indicates which array currently claims ownership of the data. That is, when the primary array is fully operational, its ownership bit 406 is set. When the primary array fails and a secondary array assumes ownership of the array data, the ownership bit 406 is set for the secondary array that has assumed ownership. For example, entry 404 associates primary array PA(0) with secondary arrays SA(01)-SA(On). The ownership bit 406 for the primary array PA(0) is set, indicating that the primary array PA(0) is fully functional.

Figure 29:
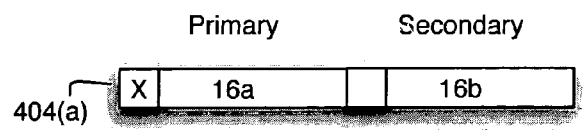
FIG. 29 is a representation of the failure database 402a of FIG. 27.

In FIG. 29, the failover database 402(*a*) is shown as it appears for the array 16*a* of FIG. 27. The entry 404*a* lists array 16*a* as the primary array, and array 16*b* as the (only) secondary array.

Figure 30:
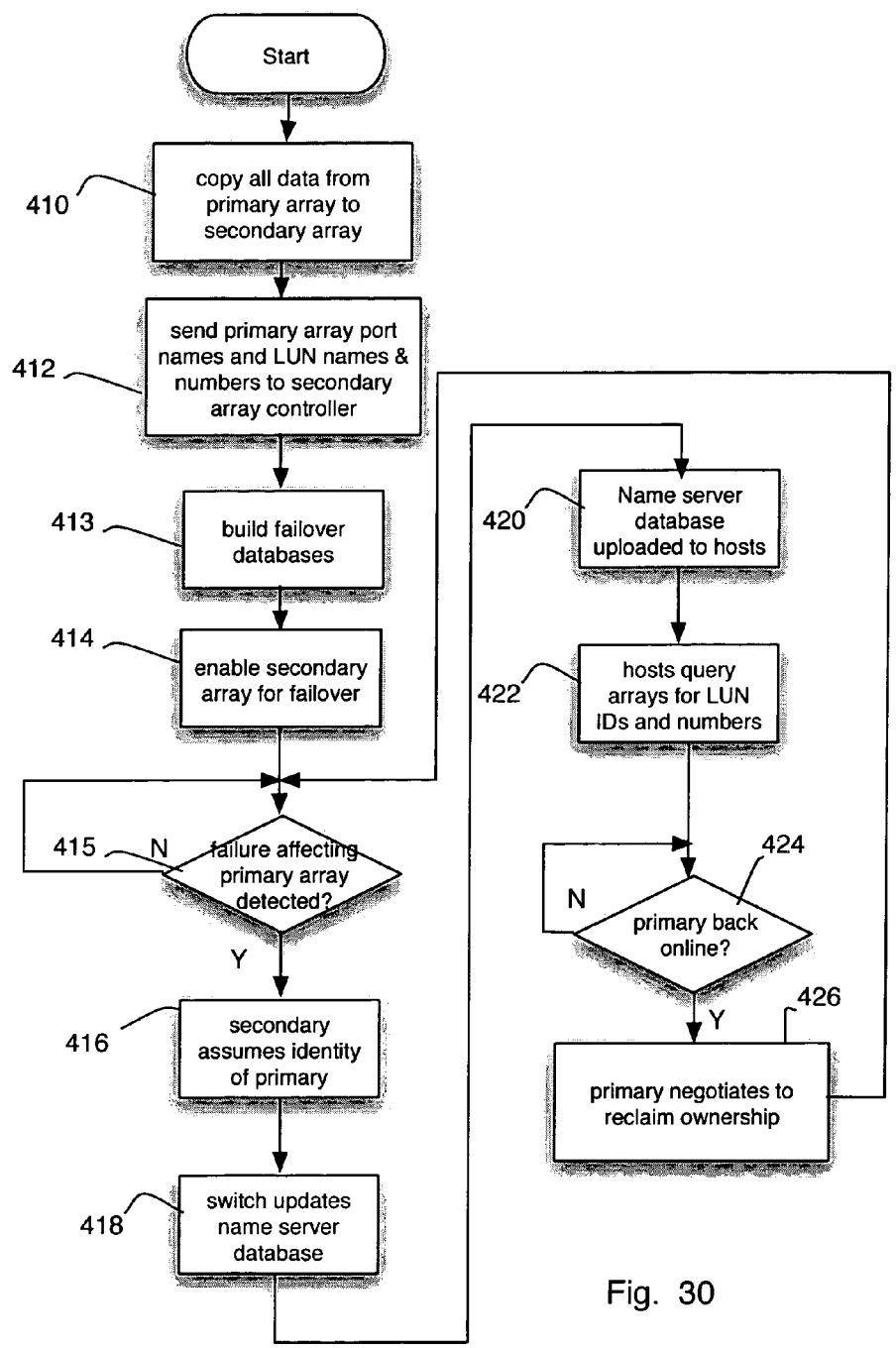
FIG. 30 is a representation of the general operation of the primary and secondary array controllers in response to a failure in the primary array, where the secondary array assumes the identity of the primary array.

The general operation of the failover process is shown in FIG. 30. In this example, the array 16*a* of FIG. 12 shall operate as the primary array, and the array 16*b* shall operate as the secondary array. The array controllers 82 and 84 are used to control the failover process in addition to the migration process previously described. For this failover example, the array controller 82 shall be referred to as the "primary array controller", and the array controller 84 shall be referred to as the "secondary array controller". The failover database 402(*a*) is initially as shown in FIG. 29. The primary array 16*a* port names are referred to as "primary port names", and the primary array 16*a* LUN names and numbers are referred to as "primary LUN names and numbers". Likewise, the secondary array 16*b* port names are referred to as "secondary port names", and the secondary array 16*b* LUN names and numbers are referred to as "secondary LUN names and numbers".

First, the backup copy is established by continually copying all the data on the primary array 16*a* to the secondary array 16*b* (step 410). This is preferably done using remote replication software, as previously described. Then, the primary port names and LUN names and numbers are sent to the secondary array controller 84 (step 412), and the failover databases are built (step 413). When these steps are complete, the secondary array 16*b* is enabled as a failover array for the primary array 16*a* (step 414). If a failure affecting the primary array 16*a* is detected by the secondary array controller 84 (step 415), then the secondary array 16*b* assumes the identity of the primary array (step 416). Then, as previously described, the switch 14 updates its name server database 40 (step 418), and the hosts are updated (step 420). The hosts 12 can now learn the LUN names and numbers for the arrays (step 422). If the primary array 16*a* comes back on-line (step 424), the primary array 16*a* negotiates with the secondary array 16*b* to reclaim ownership of the primary array data (step 426).

Figure 31:
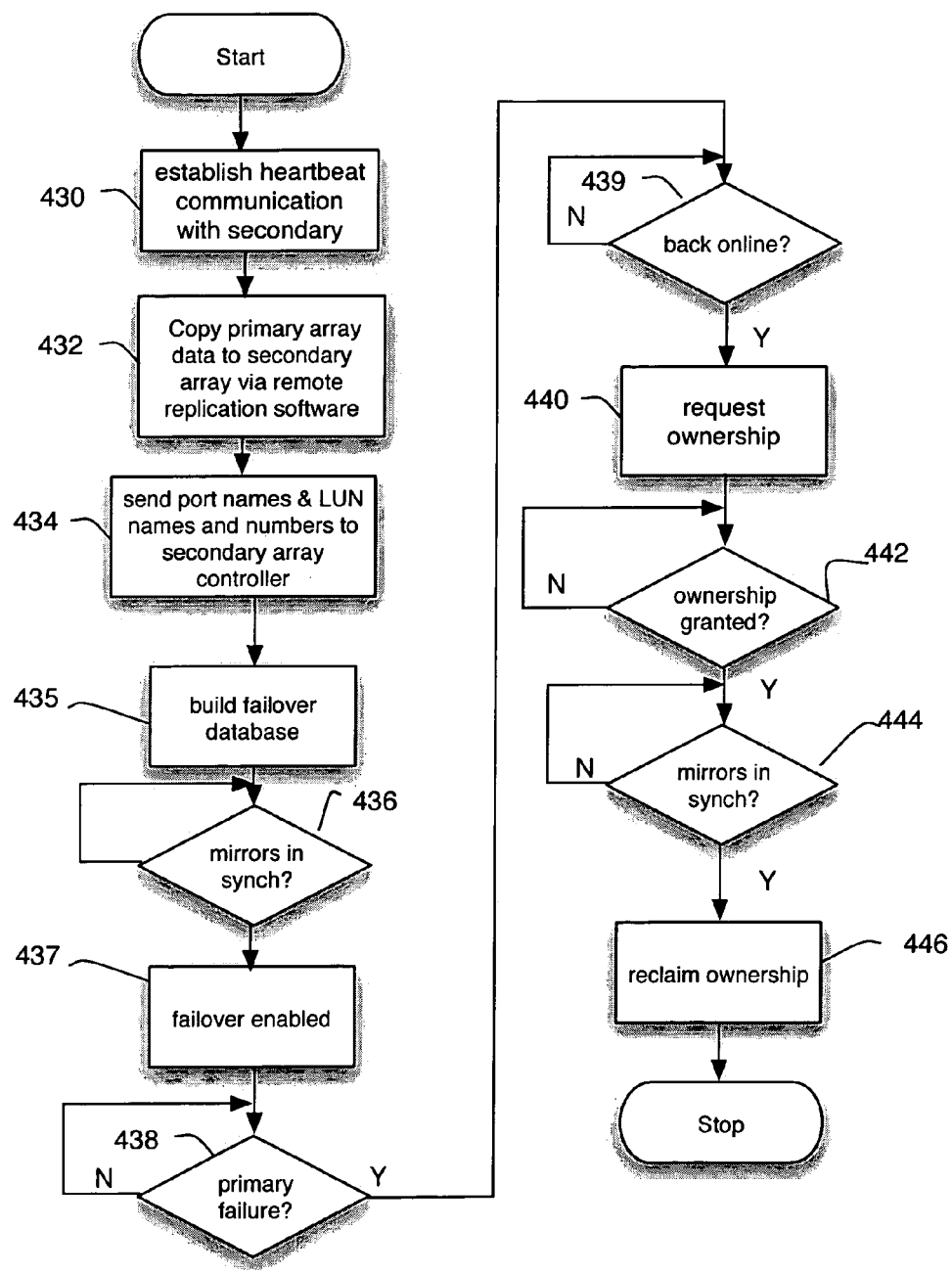
FIG. 31 is a representation of the failover operation of the primary controller in the system of FIG. 27 wherein the failure is detected by the secondary array.
Figure 32:
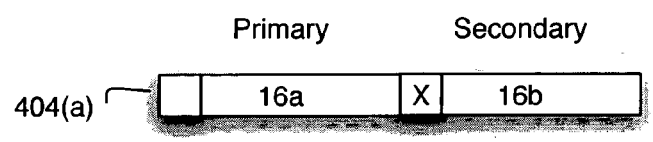
FIG. 32 is a representation of the failure database 402a after a failure of the primary array.

The operation of the primary array controller 82 is shown in FIG. 31. First, heartbeat communication is established with the secondary array controller 84 (step 430). The heartbeat communication is maintained by periodically sending heartbeat messages from the primary array controller 82 to the secondary array controller 84 via the link 80. Then the data is copied via remote replication software from the primary array 16*a* to the secondary array 16*b* (step 432). The primary port names and LUN names and addresses are then sent to the secondary array controller 84 (step 434), and the failover database 402(*a*) is built (step 435). Once the mirrors are synchronized (step 436), failover operation is enabled (step 437). In the event of a failure affecting the primary array 16*a* (step 438), the primary array controller 82 waits to see if the primary array 16*a* comes back on-line (step 439). Meanwhile, as shown in FIG. 32, if the primary array controller 82 can access the failover database 402(*a*), the primary array controller 82 updates the failure database 402(*a*) ownership bits 406 by resetting the primary array 16*a* ownership bit 406 and setting the secondary array 16*b* ownership bit 406. If the primary array recovers (step 439), then the primary array controller 82 requests ownership of the array (step 440). If ownership is granted by the secondary array 16*b* (step 442), and the mirrors are synchronized (step 444), then the array 16*a* reclaims ownership of the array data and re-establishes itself as the primary array. The ownership bits in the failure database 402*a* are re-configured to reflect the present ownership, as in FIG. 29.

Figure 33A:
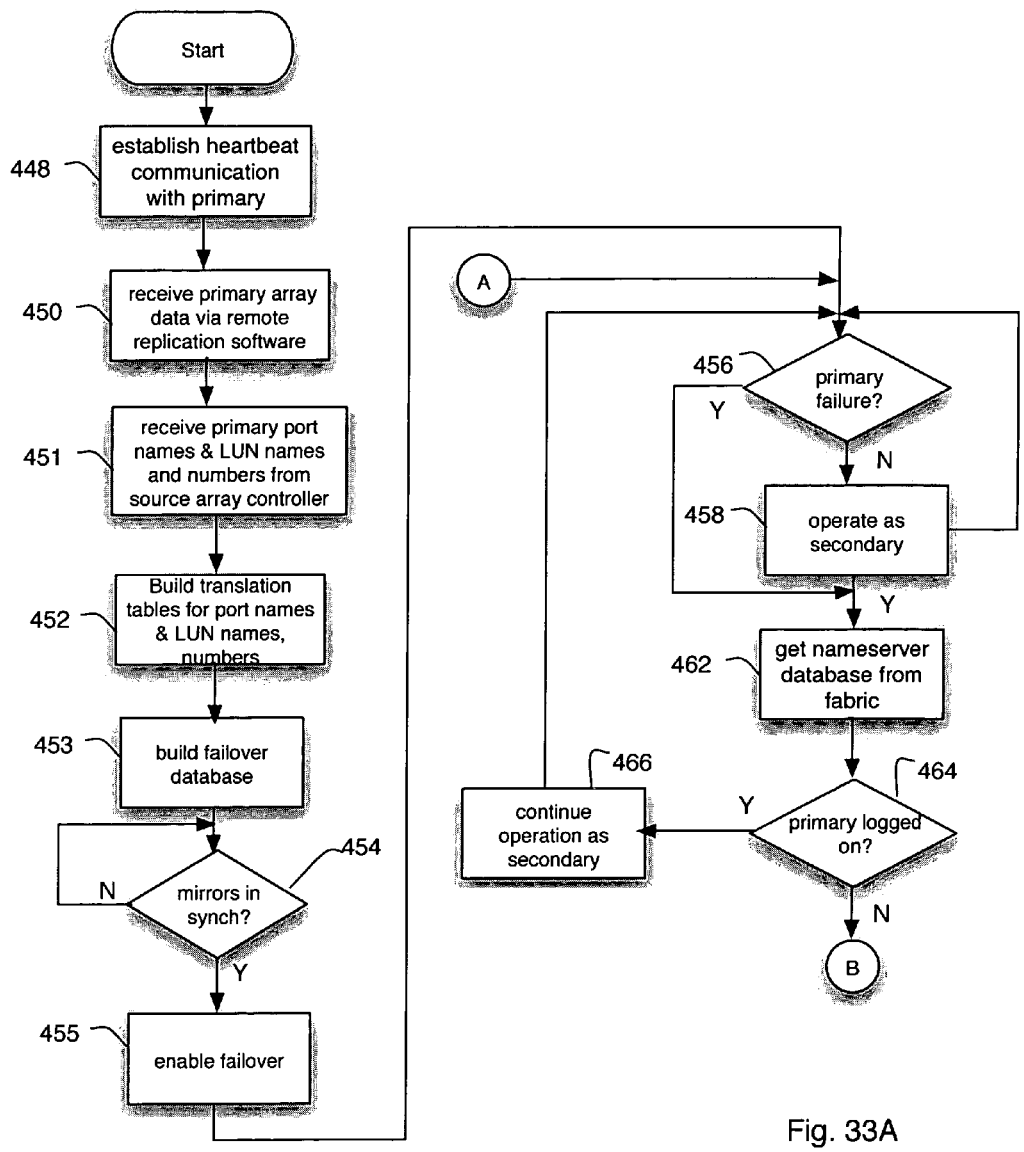
FIGS. 33A and 33B are a representation of the failover operation of the secondary controller in the system of FIG. 27, wherein the failure is detected by the secondary array.
Figure 33B:
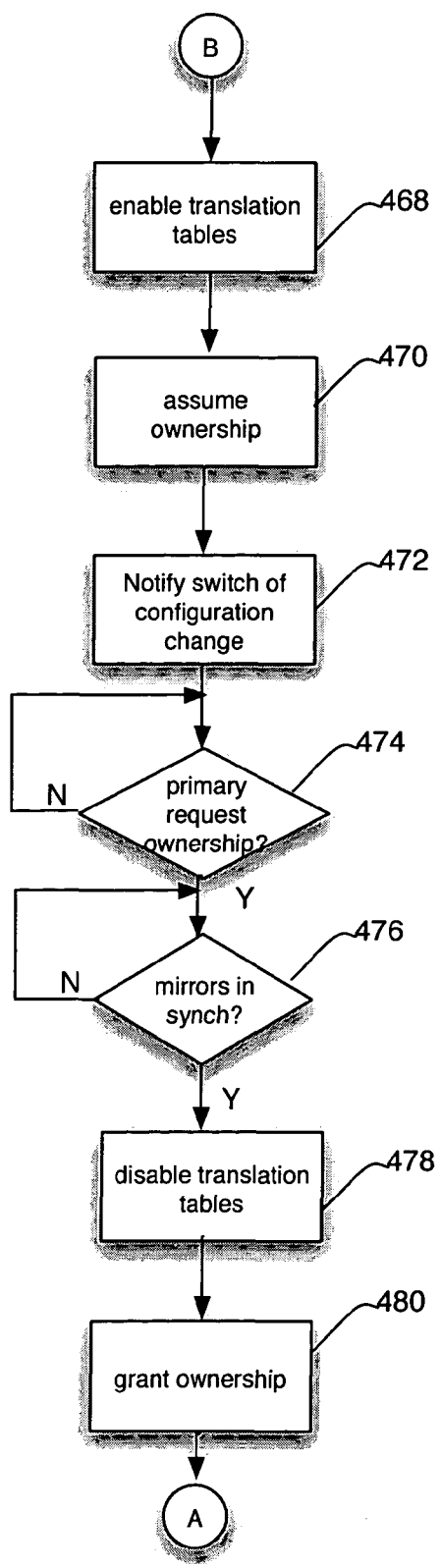

The operation of the secondary array controller 84 is shown in FIGS. 33A and 33B. First, heartbeat communication is established with the primary (step 448). The primary array data is then received from the primary array 16*a* (step 450), and then the primary port names and LUN names and numbers are received (step 451). The secondary array controller 84 builds translation tables 85 for the virtual port names and LUN names and numbers, as previously described (step 452), and then builds the failover database 402*b* (step 453). (Where "source" port names and LUN names and numbers were described, for example in FIGS. 15-17, we now refer to "primary" port names and LUN names and numbers. Where "destination" port names and LUN names and numbers were described, for example in FIGS. 19-21, we now refer to "secondary" port names and LUN names and numbers.)

Once the mirrors are synchronized (step 454), the secondary array 16*b* is enabled as a failover for the primary array 16*a* (step 455). The secondary array controller 84 now monitors the heartbeat communication from the primary array controller 82 to determine whether a failure affecting the primary array 16*a* has occurred. For example, if the secondary array controller 84 fails to observe a heartbeat signal from the primary array controller 82 for a given period of time, it may conclude that a failure has occurred in the primary virtual array 16*a*. As long as no failure is detected (step 456), then the secondary array operation continues (step 458). But if a primary failure is detected (step 456), then the secondary array controller 84 retrieves the name server database name table 42 from the switch 14 to determine whether the primary array 16*a* is logged on (step 462). If the primary array 16*a* appears in the name table 42 (step 464), indicating that the primary array 16*a* is logged on, then no failover occurs and secondary array operation continues (step 466). If the primary array 16*a* is not logged on (step 464), then the secondary array controller 84 enables its translation tables 85 (step 468) and assumes ownership of the array data by replacing the secondary port names and LUN names and numbers with the primary port names and LUN names and numbers (step 470). The secondary array controller 84 notifies the switch 14*a* of the configuration change (step 472), causing the updating of the name server database 40 and subsequent host learning of LUN names and numbers as previously described. The arrays now appear to the hosts as shown in FIG. 26.

If the primary array 16*a* recovers, the primary array controller 82 may request ownership of the array. If the primary array controller 82 requests ownership (step 474), then the secondary array controller 84 checks to ensure that the mirrors are synchronized (step 476), and then disables its translation tables 85 (step 478) and grants ownership to the primary array controller 82 (step 480).

Figure 34:
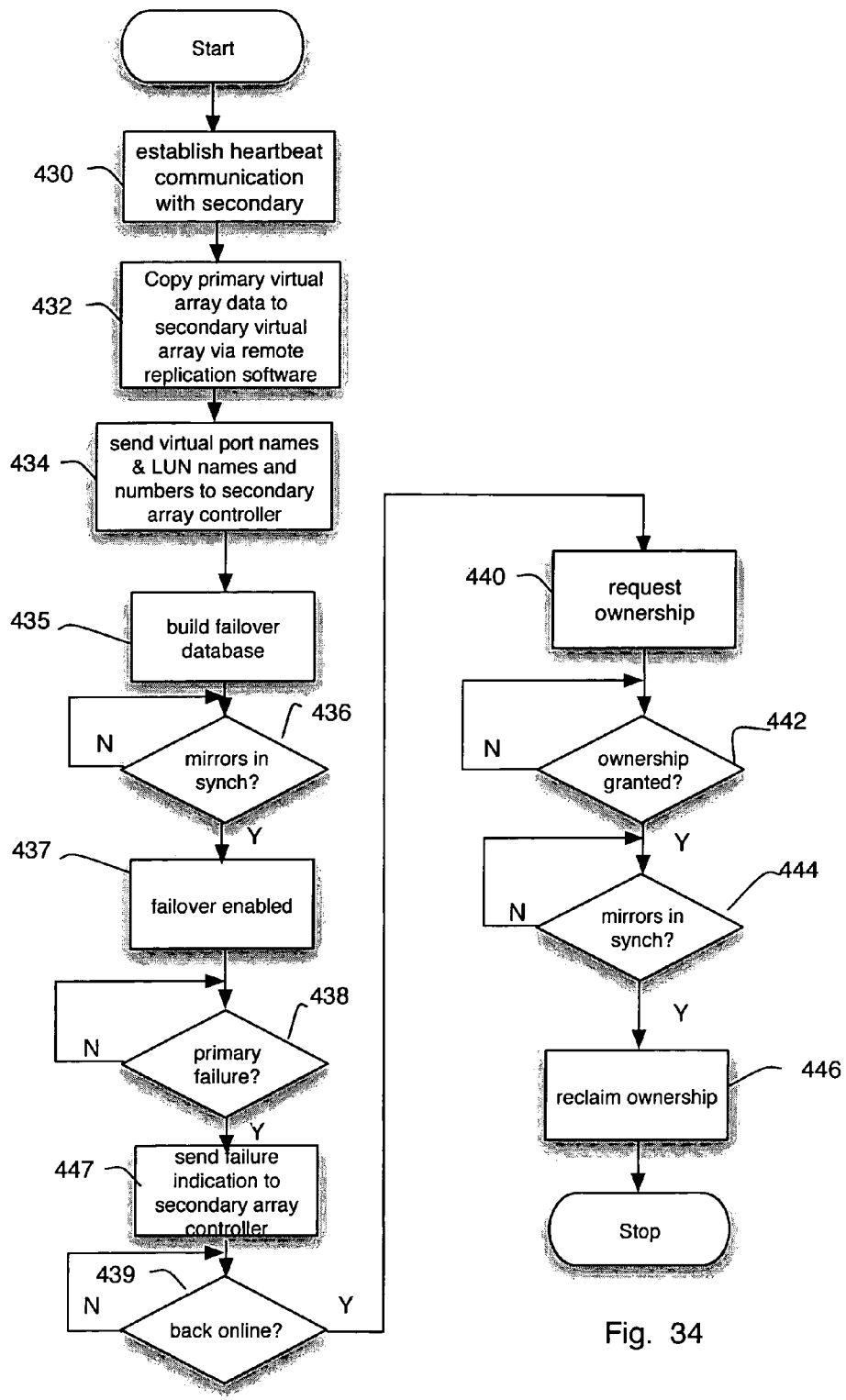
FIG. 34 is an alternate representation of the failover operation of the primary controller in the system of FIG. 27, wherein the failure is detected by the primary array.
Figure 35:
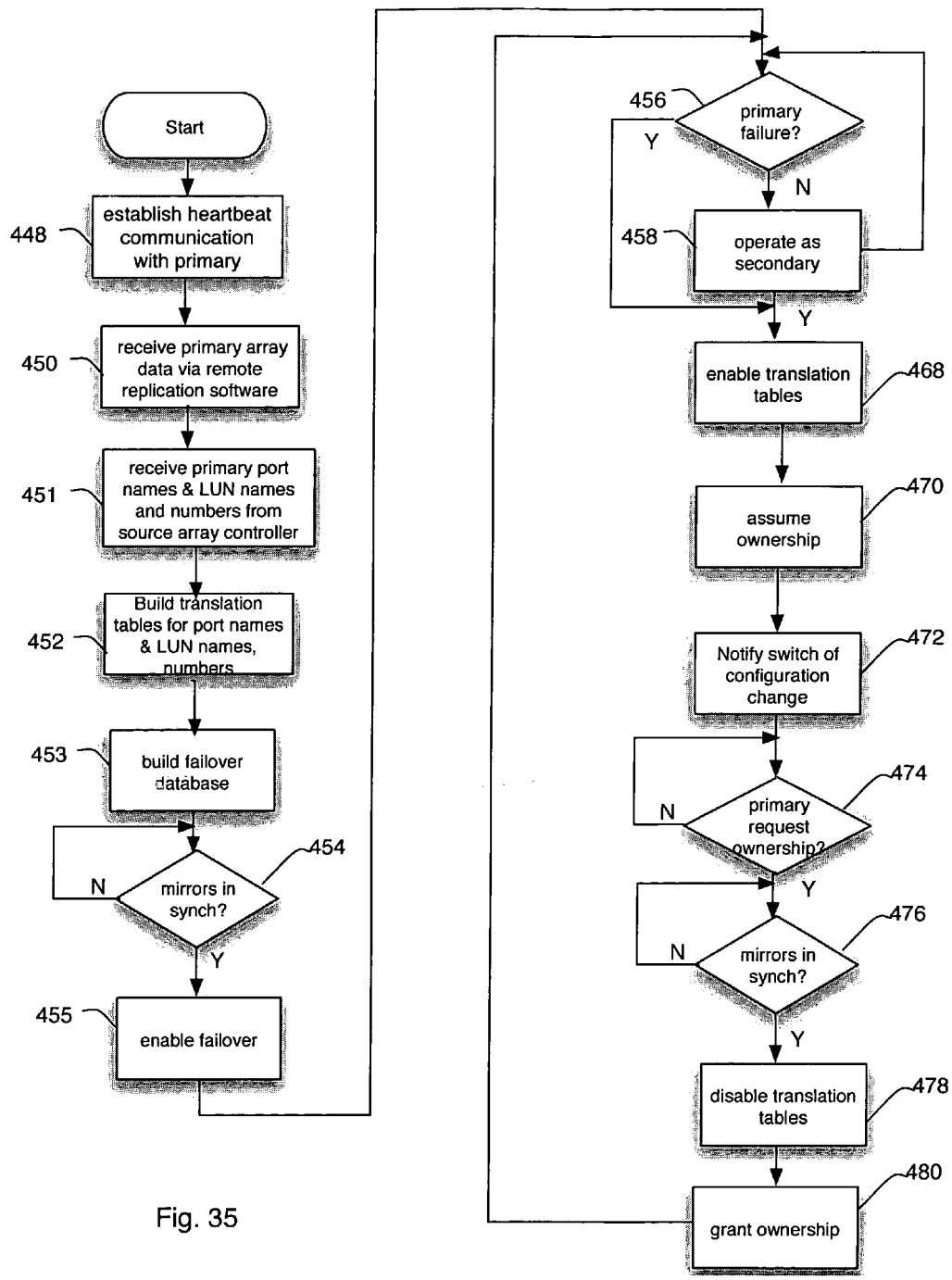
FIG. 35 is an alternate representation of the failover operation of the secondary controller in the system of FIG. 27, wherein the failover is detected by the primary array.
Figure 36:
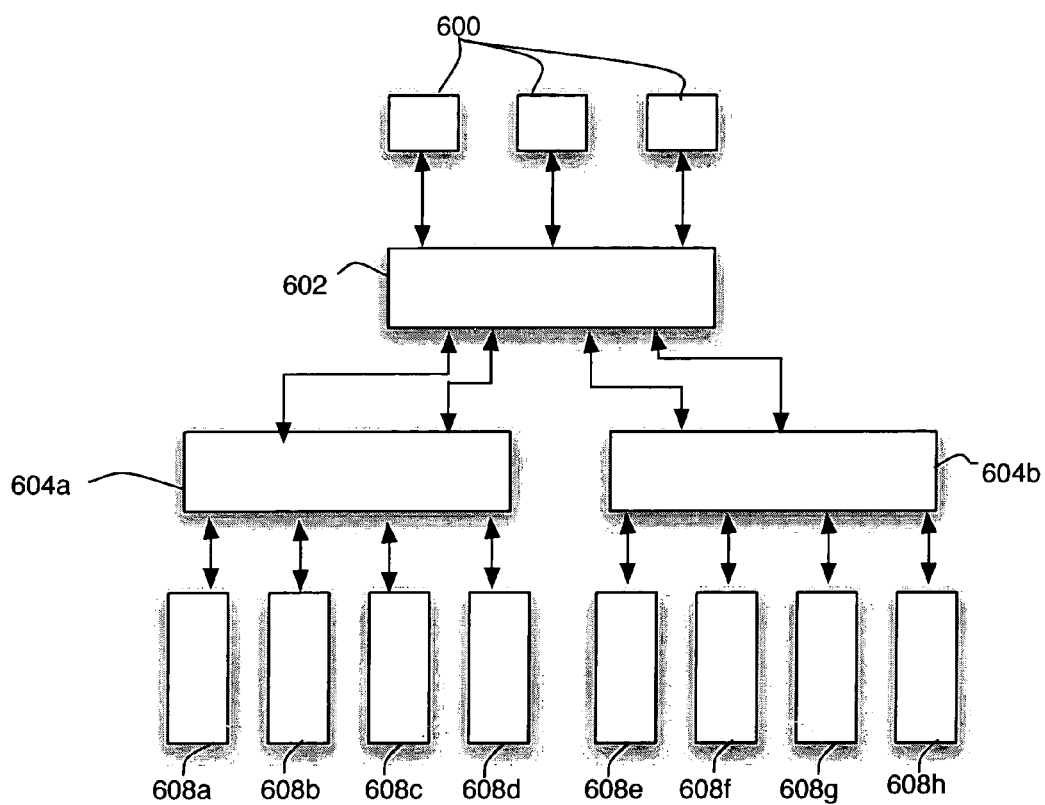
FIG. 36 is a representation of a hierarchical network system in which the invention can be implemented.

One skilled in the art will understand that the heartbeat communication used in the previous example is only one of many ways in which a failure can be detected. For instance, failure of the array 16*a* may be detected by the primary array controller 82 rather than the secondary array controller 84, perhaps in response to a failure signal internal to the array 16*a*, or indirectly as a derivation of other received information. If the source array controller 82 detects a primary array 16*a* failure, it operates as shown in FIG. 34. FIG. 34 differs from FIG. 31 in that step 447 is included after failure detection to send a failure indication to the secondary array controller 84. The operation of the secondary array controller 84 operates as shown in FIG. 35. FIG. 35 differs from FIGS.

42A,B in that steps 462, 464, and 464 have been eliminated. Since the primary array controller 82 has already indicated that the primary array 16a has failed, there is no need to check the name server database to see if the primary has failed.

It is further noted that the primary and secondary array controller 82, 84 functionality could be implemented external to the arrays 16a, 16b, for example as a central control function in another device. In this case, it is conceivable that the failover databases 402a and 402b would be combined as a failover database available to the central control function.

The above examples have been presented in terms of hosts accessing storage arrays via a switch. However, devices other than hosts may take advantage of the ability to migrate arrays and provide failover between arrays. For instance, in a hierarchically coupled Fibre Channel network, arrays may be accessed by another Fibre Channel array or controller rather than a host. Such a system is shown in FIG. 35. Here, hosts 600 are coupled to a Fibre Channel switch 602. The Fibre Channel switch 602 is coupled to Fibre Channel switches 604a and 606b. The Fibre Channel switches 604a and 604b are coupled to storage arrays 608a-h. If, for example, the array 608a is migrated to the array 608g according to one of the methods previously described, each switch 604a and 604b name server database will be updated, and then the switch 602 name server database will be updated. Similarly, if the array 608a is configured as a primary array and the array 608g is configured as a secondary array, then if a failure affects the primary array 608a, the secondary array 608g assumes the identity of the primary array 608a. Then each switch 604a and 604b name server database will be updated, and then the switch 602 name server database will be updated. The claims are intended to cover all such system configurations.

The present invention is not to be limited in scope by the specific embodiments described herein. Various modifications of the present invention, in addition to those described herein, will be apparent to those of ordinary skill in the art from the foregoing description and accompanying drawings. Though the invention is applied herein to a storage system containing LUNs, it can be applied to any device or devices that implement a transport using unique names and dynamic addresses. One skilled in the art will understand that many specific implementations can be employed to achieve the logical functionality of the invention. For instance, a distributed control function operating at the device level has been shown, but the control function can be centralized and/or can reside in places other than the devices. All such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus for use in a storage system comprising a Fibre Channel fabric having a database that associates Fibre Channel names and Fibre Channel addresses of Fibre Channel ports coupled to it, the apparatus comprising:
a source Fibre Channel device having one or more source ports coupled to the Fibre Channel fabric, each source port having a source port name unique to the device and an assignable source port address;
a destination Fibre Channel device having one or more destination ports coupled to the Fibre Channel fabric, each destination port having a destination port name unique to the device and an assignable destination port address;
logic for copying all data resident on the source Fibre Channel device to the destination Fibre Channel device;
logic for replacing the destination port names at the destination device with the source port names so that the source port names are now unique to the destination device and no longer associated with the source device;
logic for causing the fabric to update its database so that the database associates the destination port addresses with the source port names after the destination port names have been preplaced with the source port names at the destination device.

2. The apparatus of claim 1 wherein the source Fibre Channel device is a source storage array and the destination Fibre Channel device is a destination storage array.

3. The apparatus of claim 2 wherein the source storage array exports source LUNs, each source LUN having a source LUN name and source LUN number, and wherein the destination storage array exports destination LUNs, each destination LUN having a destination LUN name and a destination LUN number, and wherein the logic for replacing further comprises logic for replacing the destination LUN names with the source LUN names.

4. The apparatus of claim 3 wherein the logic for replacing further comprises logic for replacing the destination LUN numbers with the source LUN numbers.

5. The apparatus of claim 4 wherein the destination storage array comprises a destination port translation table, the destination port translation table associating the destination port names with the source port names,
the destination port translation table used by the logic for replacing for replacing the destination port names with the source port names.

6. The apparatus of claim 5 wherein the destination storage array comprises a destination LUN translation table, the destination LUN translation table associating the destination LUN names and numbers with the source LUN names and numbers;
the destination LUN translation table used by the logic for replacing for replacing destination LUN names and numbers with the source LUN names and numbers respectively.

7. The apparatus of claim 6 wherein the apparatus for replacing comprises a destination controller in the destination array, the destination controller capable of enabling the destination port and destination LUN translation tables.

8. The apparatus of claim 7 wherein the apparatus for replacing further comprises a source controller in the source array, wherein the destination controller enables the destination port translation tables and destination LUN translation tables respectively in accordance with a handshake protocol between the destination controller and the source controller.

9. A program product comprising a non-transitory computer readable medium having embodied therein a computer program for storing data, the computer program for operation in a system including a Fibre Channel fabric having a database that associates Fibre Channel names and Fibre Channel addresses of Fibre Channel ports coupled to it, a source Fibre Channel device having one or more source ports coupled to the Fibre Channel fabric, each source port having a source port name unique to the device and an assignable source port address, a destination Fibre Channel device having one or more destination ports coupled to the Fibre Channel fabric, each destination port having a destination port name unique to the device and an assignable destination port address, the program product comprising:
    logic for copying all data resident on the source Fibre Channel device to the destination Fibre Channel device;
    logic for replacing the destination port names at the destination device with the source port names so that the source port names are now unique to the destination device and no longer associated with the source device;
    logic for causing the fabric to update its database so that the database associates the destination port addresses with the source port names after the destination port names have been preplaced with the source port names at the destination device.

10. The program product of claim 9 wherein the source Fibre Channel device is a source storage array and the destination Fibre Channel device is a destination storage array.

11. The program product of claim 10 wherein the source storage array exports source LUNs, each source LUN having a source LUN name and source LUN number, and wherein the destination storage array exports destination LUNs, each destination LUN having a destination LUN name and a destination LUN number, and wherein:
    the logic for replacing further comprises logic for replacing the destination LUN names with the source LUN names.

12. The program product of claim 11 wherein the destination storage array comprises a destination port translation table, the destination translation table associating the destination port names with the source port names;
    the destination port translation table used by the logic for replacing for replacing the destination port names with the source port names.

13. The program product of claim 12 wherein the destination storage array comprises a destination LUN translation table, the destination LUN translation table associating the destination LUN names and numbers with the source LUN names and numbers;
    the destination LUN translation table used by the logic for replacing for replacing the destination LUN names with the source LUN names respectively.

14. The program product of claim 13 wherein the logic for replacing comprises destination controller logic in the destination array, the destination controller logic capable of enabling the destination port translation table and destination LUN translation table.

15. The apparatus of claim 14 further comprising source controller logic in the source array, wherein the destination controller logic enables the destination port translation table and destination LUN translation table in accordance with a handshake protocol between the source controller logic and the destination controller logic.

16. A method for operation in a system comprising:
    a Fibre Channel fabric having a database that associates Fibre Channel names and Fibre Channel addresses of Fibre Channel ports coupled to it;
        a source Fibre Channel device having one or more source ports coupled to the Fibre Channel fabric, each source port having a source port name unique to the device and an assignable source port address;
        a destination Fibre Channel device having one or more destination ports coupled to the Fibre Channel fabric, each destination port having a destination port name unique to the device and an assignable destination port address;
    the method comprising the steps of:
        copying all data resident on the source Fibre Channel device to the destination Fibre Channel device;
        replacing the destination port names at the destination device with the source port names so that the source port names are now unique to the destination device and no longer associated with the source device;
        causing the fabric to update its database so that the database associates the destination port addresses with the source port names after the destination port names have been preplaced with the source port names at the destination device.

17. The method of claim 16 wherein the source Fibre Channel device is a source storage array and the destination Fibre Channel device is a destination storage array.

18. The method of claim 17 wherein the source storage array exports source LUNs, each source LUN having a source LUN name and source LUN number, and wherein the destination storage array exports destination LUNs, each destination LUN having a destination LUN name and a destination LUN number, and wherein the step of replacing further comprises the step of:
    replacing the destination LUN names with the source LUN names.

19. The method of claim 18 wherein the destination storage array comprises a destination port translation table, the destination port translation table associating the destination port names with the source port names;
    the destination translation table used by the logic for replacing for replacing the destination port names with the source port names.

20. The method of claim 19 wherein destination storage array comprises a destination LUN translation table, the destination LUN translation table associating the destination LUN names and numbers with the source LUN names and numbers;
    the destination LUN translation table used by the logic for replacing for replacing the destination LUN names and numbers with the source LUN names and numbers.

21. The method of claim 20 wherein the destination array includes a destination controller, the step of replacing further comprising the step of
    enabling by the destination controller the destination port and destination LUN translation tables.

22. The method of claim 21 wherein the source array includes a source controller and the step of enabling comprises enabling operates in accordance with a handshake protocol between the destination controller and the source controller.

23. Apparatus for use in a storage system comprising a Fibre Channel fabric having a database that associates Fibre Channel names and Fibre Channel addresses of Fibre Channel ports coupled to it, the apparatus comprising:
    a primary Fibre Channel device having one or more primary ports coupled to the Fibre Channel fabric, each primary port having a primary port name unique to the device and an assignable primary port address;
    a secondary Fibre Channel device having one or more secondary ports coupled to the Fibre Channel fabric, each secondary port having a secondary port name unique to the device and an assignable secondary port address;
    logic for copying all data resident on the primary Fibre Channel device to the secondary Fibre Channel device;
    logic responsive to a failure for:
        replacing the secondary port names with the primary port names at the secondary Fibre Channel device so that the primary port names are now unique to the secondary device and no longer associated with the primary device;

causing the fabric to update its database so that the database associates the secondary port addresses with the primary port names after the secondary port names have been replaced with the primary port names at the secondary device.

24. The apparatus of claim 23 wherein the primary Fibre Channel device is a primary storage array and the secondary Fibre Channel device is a secondary storage array.

25. The apparatus of claim 24 wherein the primary storage array exports primary LUNs, each primary LUN having a primary LUN name and primary LUN number, and wherein the secondary storage array exports secondary LUNs, each secondary LUN having a secondary LUN name and a secondary LUN number, and wherein the logic for replacing further comprises logic for replacing the secondary LUN names with the primary LUN names.

26. The apparatus of claim 25 wherein the logic for replacing further comprises logic for replacing the secondary LUN numbers with the primary LUN numbers.

27. The apparatus of claim 26 wherein the secondary storage array comprises a secondary port translation table, the secondary port translation table associating the secondary port names with the primary port names,
the secondary port translation table used by the logic for replacing for replacing the secondary port names with the primary port names.

28. The apparatus of claim 27 wherein the secondary storage array comprises a secondary LUN translation table, the secondary LUN translation table associating the secondary LUN names and numbers with the primary LUN names and numbers;
the secondary LUN translation table used by the logic for replacing for replacing secondary LUN names and numbers with the primary LUN names and numbers respectively.

29. The apparatus of claim 28 wherein the logic for replacing includes a failover database associating the primary storage array with the secondary storage array, the failover database indicating which of the primary and secondary storage arrays has ownership of the data initially resident on the primary storage array.

30. The apparatus of claim 29 wherein the apparatus for replacing comprises a secondary controller in the secondary array, the secondary controller capable of enabling the secondary port and secondary LUN translation tables.

31. The apparatus of claim 30 wherein the apparatus for replacing further comprises a primary controller in the primary array, wherein the secondary controller enables the secondary port translation tables and secondary LUN translation tables respectively in accordance with a handshake protocol between the secondary controller and the primary controller.

32. A program product comprising a non-transitory computer readable medium having embodied therein a computer program for storing data, the computer program for operation in a system including a Fibre Channel fabric having a database that associates Fibre Channel names and Fibre Channel addresses of Fibre Channel ports coupled to it, a primary Fibre Channel device having one or more primary ports coupled to the Fibre Channel fabric, each primary port having a primary port name unique to the device and an assignable primary port address, a secondary Fibre Channel device having one or more secondary ports coupled to the Fibre Channel fabric, each secondary port having a secondary port name unique to the device and an assignable secondary port address; the program product comprising:

logic for copying all data resident on the primary Fibre Channel device to the secondary Fibre Channel device;
logic responsive to a failure for:
replacing the secondary port names with the primary port names at the secondary Fibre Channel device so that the primary port names are now unique to the secondary device and no longer associated with the primary device;
causing the fabric to update its database so that the database associates the secondary port addresses with the primary port names after the secondary port names have been preplaced with the primary port names at the secondary device.

33. The program product of claim 32 wherein the primary Fibre Channel device is a primary storage array and the secondary Fibre Channel device is a secondary storage array.

34. The program product of claim 33 wherein the primary storage array exports primary LUNs, each primary LUN having a primary LUN name and primary LUN number, and wherein the secondary storage array exports secondary LUNs, each secondary LUN having a secondary LUN name and a secondary LUN number, and wherein:
the logic for replacing further comprises logic for replacing the secondary LUN names with the primary LUN names.

35. The program product of claim 34 wherein the secondary storage array comprises a secondary port translation table, the secondary translation table associating the secondary port names with the primary port names;
the secondary port translation table used by the logic for replacing for replacing the secondary port names with the primary port names.

36. The program product of claim 35 wherein the secondary storage array comprises a secondary LUN translation table, the secondary LUN translation table associating the secondary LUN names and numbers with the primary LUN names and numbers;
the secondary LUN translation table used by the logic for replacing for replacing the secondary LUN names with the primary LUN names respectively.

37. The program product of claim 36 wherein the logic for replacing includes a failover database associating the primary storage array with the secondary storage array, the failover database indicating which of the primary and secondary storage arrays has ownership of the data initially resident on the primary storage array.

38. The program product of claim 37 wherein the logic for replacing comprises secondary controller logic in the secondary array, the secondary controller logic capable of enabling the secondary port translation table and secondary LUN translation table.

39. The apparatus of claim 38 further comprising primary controller logic in the primary array, wherein the secondary controller logic enables the secondary port translation table and secondary LUN translation table in accordance with a handshake protocol between the primary controller logic and the secondary controller logic.

40. A method for operation in a system comprising:
a Fibre Channel fabric having a database that associates Fibre Channel names and Fibre Channel addresses of Fibre Channel ports coupled to it;
a primary Fibre Channel device having one or more primary ports coupled to the Fibre Channel fabric, each primary port having a primary port name unique to the device and an assignable primary port address;
a secondary Fibre Channel device having one or more secondary ports coupled to the Fibre Channel fabric, each secondary port having a secondary port name unique to the device and an assignable secondary port address;

the method comprising the steps of:
copying all data resident on the primary Fibre Channel device to the secondary Fibre Channel device;
in response to a failure:
replacing the secondary port names with the primary port names at the secondary Fibre Channel device so that the primary port names are now unique to the secondary device and no longer associated with the primary device;
causing the fabric to update its database so that the database associates the secondary port addresses with the primary port names after the secondary port names have been preplaced with the primary port names at the secondary device.

41. The method of claim 40 wherein the primary Fibre Channel device is a primary storage array and the secondary Fibre Channel device is a secondary storage array.

42. The method of claim 41 wherein the primary storage array exports primary LUNs, each primary LUN having a primary LUN name and primary LUN number, and wherein the secondary storage array exports secondary LUNs, each secondary LUN having a secondary LUN name and a secondary LUN number, and wherein the step of replacing further comprises the step of:
replacing the secondary LUN names with the primary LUN names.

43. The method of claim 42 wherein the secondary storage array comprises a secondary port translation table, the secondary port translation table associating the secondary port names with the primary port names;
wherein the step of replacing uses the secondary translation table for replacing the secondary port names with the primary port names.

44. The method of claim 43 wherein secondary storage array comprises a secondary LUN translation table, the secondary LUN translation table associating the secondary LUN names and numbers with the primary LUN names and numbers;
wherein the step of replacing uses the secondary LUN translation table for replacing the secondary LUN names and numbers with the primary LUN names and numbers.

45. The method of claim 44 wherein the step of replacing uses a failover database associating the primary storage array with the secondary storage array, the failover database indicating which of the primary and secondary storage arrays has ownership of the data initially resident on the primary storage array.

46. The method of claim 45 wherein the secondary array includes a secondary controller, the step of replacing further comprising the step of
enabling by the secondary controller the secondary port and secondary LUN translation tables.

47. The method of claim 46 wherein the primary array includes a primary controller and the step of enabling operates in accordance with a handshake protocol between the secondary controller and the primary controller.

\* \* \* \* \*